United States Patent
Onizuka et al.

(10) Patent No.: US 6,724,627 B2
(45) Date of Patent: Apr. 20, 2004

(54) POWER DISTRIBUTOR FOR A VEHICLE AND PRODUCTION METHOD THEREOF

(75) Inventors: Takahiro Onizuka, Nagoya (JP); Isao Isshiki, Nagoya (JP); Shigeki Yamane, Nagoya (JP)

(73) Assignees: Autonetworks Technologies, Ltd., Nagoya (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 387 days.

(21) Appl. No.: 09/812,555

(22) Filed: Mar. 21, 2001

(65) Prior Publication Data

US 2001/0026430 A1 Oct. 4, 2001

(30) Foreign Application Priority Data

| Mar. 21, 2000 | (JP) | 2000-077550 |
| Mar. 31, 2000 | (JP) | 2000-096668 |
| Mar. 31, 2000 | (JP) | 2000-097187 |

(51) Int. Cl.$^7$ ................................................ H05K 7/20
(52) U.S. Cl. ................ 361/704; 361/601; 361/641; 361/642; 361/643; 361/648; 361/719; 361/720; 174/52.1; 174/52.2; 165/80.3; 165/185; 337/189
(58) Field of Search .................. 361/601, 627, 361/628, 641, 642; 174/52.1, 17 R; 337/189

(56) References Cited

U.S. PATENT DOCUMENTS

| 5,640,293 A | * | 6/1997 | Dawes et al. ............... 361/93.7 |
| 5,814,765 A | * | 9/1998 | Bauer et al. ............... 174/50.54 |
| RE36,317 E | * | 9/1999 | Arratia ........................ 337/206 |
| 6,116,916 A | * | 9/2000 | Kasai ........................ 439/76.2 |
| 6,195,263 B1 | * | 2/2001 | Aoike et al. ................. 361/752 |
| 6,265,659 B1 | * | 7/2001 | Kaiser ........................ 174/52.1 |
| 6,265,840 B1 | * | 7/2001 | Wiezorek et al. .......... 318/434 |
| 6,396,380 B1 | * | 5/2002 | Girke et al. ................ 337/189 |
| 6,430,054 B1 | * | 8/2002 | Iwata ......................... 361/752 |
| 6,522,528 B2 | * | 2/2003 | Yamane ...................... 361/601 |

FOREIGN PATENT DOCUMENTS

JP 10-126963 A 5/1998

* cited by examiner

Primary Examiner—Boris Chervinsky
(74) Attorney, Agent, or Firm—Oliff & Berridge, PLC

(57) ABSTRACT

In the power distributor using a semiconductor switching element, input terminals 10I and 10L, output terminals 12A–12J, connected to the element, and more preferably, the board terminals 30 and 32, are structured by a metallic plate, and arranged on the same plane perpendicular to the plate thickness. The metallic plate can be integrated by the resin mold, thereby the structure can be greatly simplified. The metallic plate can be produced by a greatly simple method by which, after the punching out of the metallic plate and the molding of the resin mold, a predetermined portion of the metallic plate is cut and the semiconductor switching element is mounted, and it can contribute to also the reduction of the cost.

28 Claims, 14 Drawing Sheets

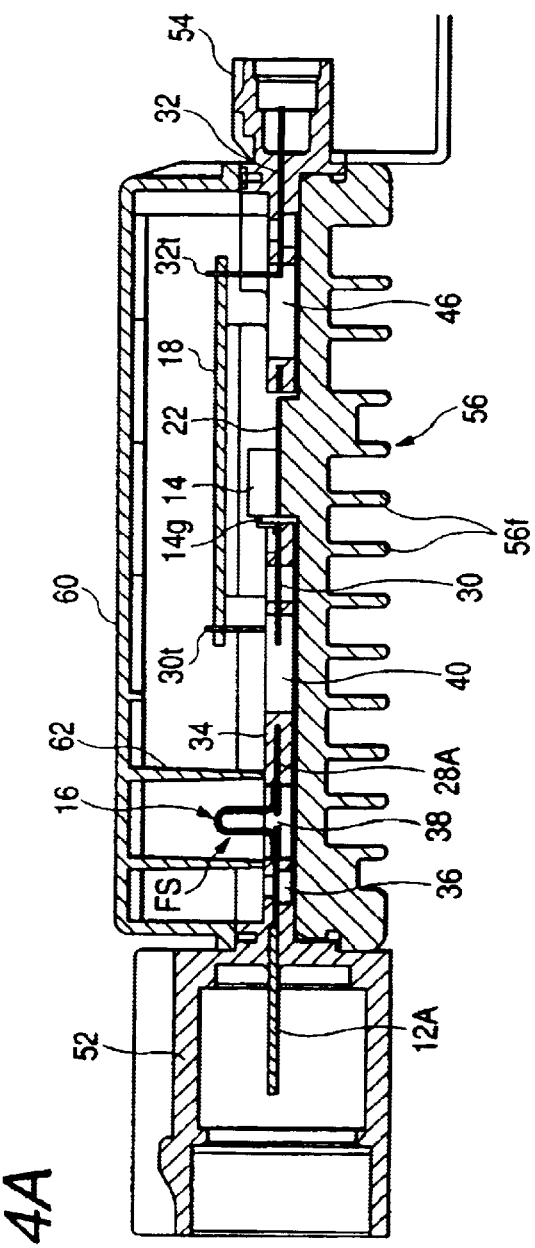
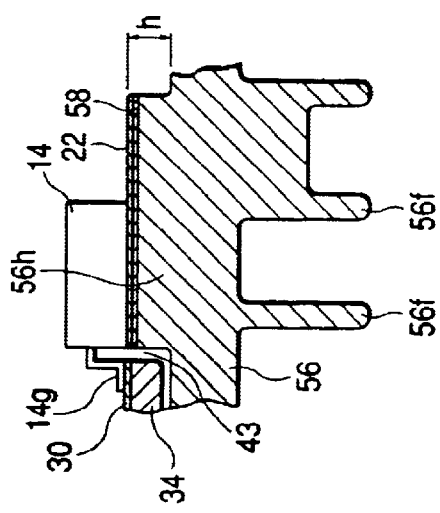
FIG. 4A
FIG. 4B

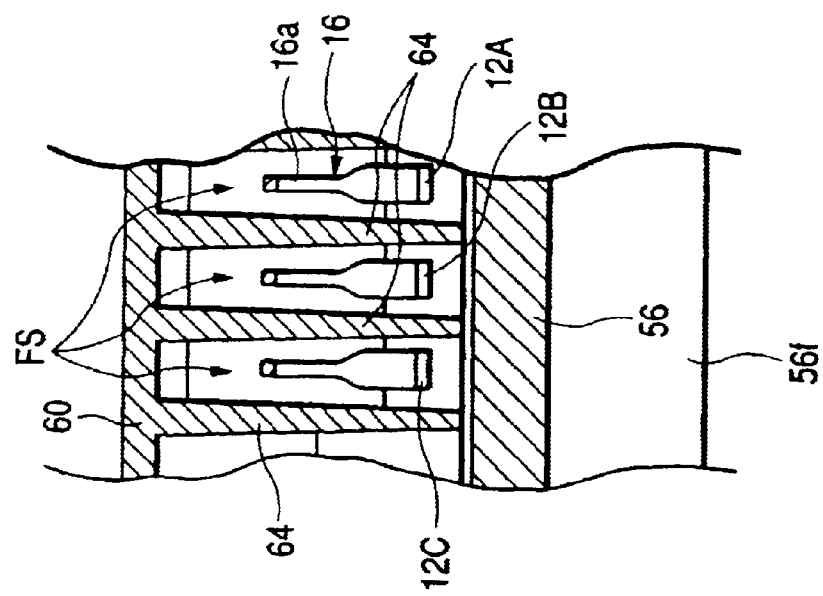
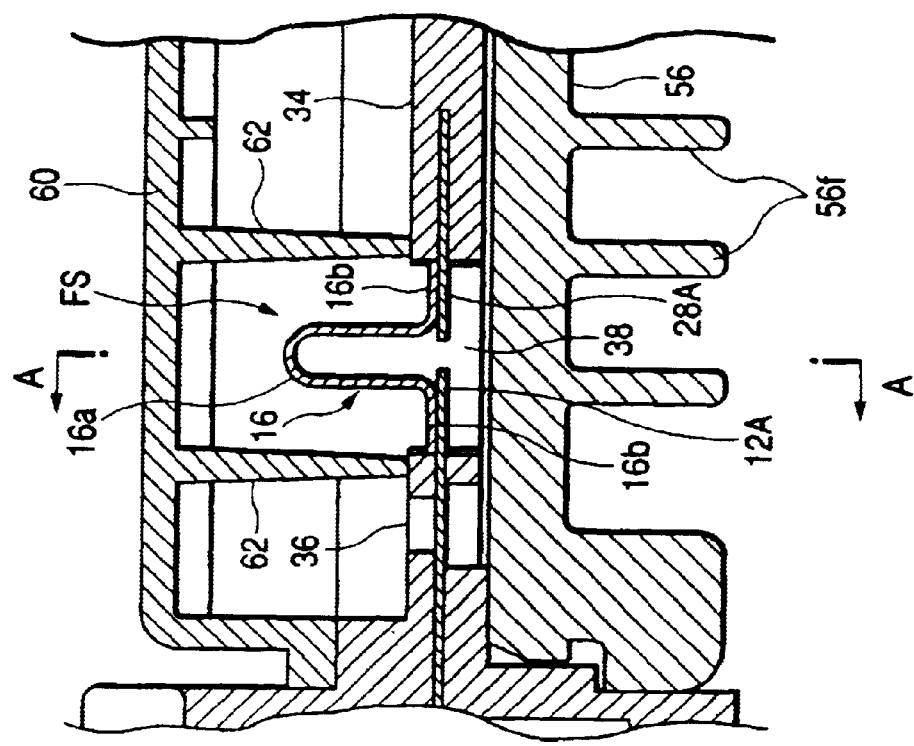

POWER DISTRIBUTOR FOR A VEHICLE AND PRODUCTION METHOD THEREOF

BACKGROUND OF THE INVENTION

1. Field of the Invention

The present invention relates to a power distributor for a vehicle for distributing electric power from a power source such as a battery equipped in the vehicle to a plurality of electronic units such as a unit for a center cluster, a unit for an air conditioner, and a unit for a door, and to a production method thereof.

2. Description of the Related Art

Conventionally, for distributing electric power from a common car-mounted power source to each electronic unit, an electric connection box is well-known in which a power distributing circuit is structured by laminating plural sheets of bus bar substrates, and fuses and relay switches are assembled therein.

Further, recently, in order to realize a size reduction of the electric connection box and the high speed switching control, the power distributor has been developed in which semiconductor switching elements such as FETs are inserted between the input terminal and the output terminal instead of relays. For example, JP-A-10-126963 discloses an example in which drain terminals of a plurality of semiconductor switching elements are connected to a metallic plate connected to a power source input terminal, and source terminals of these semiconductor switching elements are respectively connected to separated power source output terminals, and a gate terminal of each of the semiconductor switching elements is connected to a control circuit board.

Further, according to the above publication, a semiconductor switch control chip is mounted on the control circuit board separately from each of the semiconductor switching elements, and when the over current flows through the semiconductor switching element, or when the semiconductor switching element is over heated, a control signal to forcibly turn off the element is inputted into the gate terminal of each of the semiconductor switching elements from the semiconductor switch control chip. In this manner, when the fuse function is added to each of the semiconductor switching elements, because there is unnecessary to assemble a large sized fuse block which requires the exchange operation such as the conventional electric connection box, the maintenance operation is simplified.

The size reduction of the electric connection box into a box smaller than the conventional box is advanced by the introduction of the semiconductor switching element. However, because the electric connection box at least requires the input terminals for introducing the large current, a number of output terminals for distributing the electric power to each of the electronic units, and the control circuit board for controlling the semiconductor switching elements. Therefore, it is difficult to reduce the size so much, and particularly, the reduction of the dimension on thickness becomes a large problem.

Moreover, because a large number of semiconductor switching elements are used, there is a possibility that the temperature in the box is greatly increased due to their heat radiation. Particularly, in the semiconductor switching elements, because the semiconductor switching elements are formed into a package together with a metallic plate on which these elements are mounted, for the purpose of the size reduction, and are in the condition that the packaged units are mounted on the circuit board, there is a disadvantage in which the heat radiated by each of the semiconductor switching elements is easily accumulated, and easily affects the thermally bad influence on the other elements on the circuit board on which the package is mounted.

Moreover, there is a possibility that the semiconductor switching elements are failed and the operation failure occurs due to the over current flowing through the semiconductor switching element or over heat of the semiconductor switching element. When such an operation failure occurs, even when the control signal to be forced turn-off is inputted into the gate terminal of the semiconductor switching element, there is a possibility that the semiconductor switching element is not turned off, and the fuse function is not operated.

SUMMARY OF THE INVENTION

In view of the foregoing problems, an object of the invention is to provide a power distributor for a vehicle which can conduct good power distribution to each electronic unit from a car-mounted power source by a simple and thin type structure, and a method by which the power distributor can be produced by a simple process.

Moreover, another object of the present invention is to provide a power distributor for a vehicle in which the semiconductor switching elements can be properly assembled in the power distribution circuit, and the cooling can be effectively conducted by a simple structure having small number of parts.

According to the invention, there is provided a power distributor for a vehicle for distributing electric power from a common power source equipped in a vehicle to a plurality of electronic units, and an input terminal connected to the power source, a plurality of outputs terminals connected to each of the electronic units, and a plurality of semiconductor switching elements inserted between the input terminal and each of outputs terminals are provided in the distributor, and the input terminal and the output terminal are structured by metallic plates, and the input terminal and the output terminal are arranged on the same plane which is perpendicular to the direction of the plate thickness of the metallic plate.

In this structure, the power source electric power inputted into the input terminal is distributed to each of the output terminals through each of the semiconductor switching elements, and supplied from these output terminals to predetermined electronic units. Further, because the input terminal and output terminals are structured by a metallic plate, and arranged on the surface perpendicular to the direction of the plate thickness, the whole thickness of the power distributor is greatly reduced, and a large degree of compactness and the thickness reduction can be realized.

Herein, the phrase of "arranged on the same plane" does not always means that the whole portions of all terminals are arranged on the same plane, that is, the all terminals are not limited to the planar ones, but, it may be included that the input terminal and the output terminals have also the shape partly depart from the "same plane". For example, it may be allowed that a portion of the input terminal and the output terminal which are basically arranged on the same plane, is bent and formed into a tab, as will be described later, or the shape in which the end portions of the terminals protrude over a plurality of rows, may also be allowable.

In the present invention, further, the input terminal and the output terminals can be integrated by a simple structure by the resin mold, and when they are integrated by such the resin mold, by protruding the end portion of each of terminals toward the outside of the resin mold, the outer wiring to each of input terminal and output terminals can be easily carried out.

In this connection, this power distributor can be easily produced by a method which includes: a punching process to produce an original plate in which the input terminal and the output terminal are integrally connected to each other, by punching a single metallic plate into a predetermined shape; a molding process to form the resin mold having, outside the original plate, a window for cutting to expose a connection portion of both terminals in the original plate to the outside, and a window for element to expose an area portion on which the semiconductor switching element is mounted, to the outside; a cutting process to cut the connection portion through the window for cutting; and an element arranging process to arrange the semiconductor switching element in the window for element.

In the power distributor, the cover attached to the resin mold in such a manner that it covers each of semiconductor switching elements, is provided, and the case to accommodate the semiconductor switching elements can also be structured by the cover and the resin mold. In this manner, when the resin mold to integrate each of terminals is used as the case main body, the structure can be further simplified.

The input terminal may be a single, however, when a plurality of input terminals connected to the common power source through paths different from each other are provided, the power distribution having power feeding paths different from each other can be respectively independently and adequately carried out.

Further, when each of the input terminals is arranged in the condition that input terminals protrude in the same direction, the connection operation of a power line to these input terminals can be collectively carried out.

On the one hand, for also the output terminals, when all output terminals are arranged in the condition that they protrude in the same direction, the connection of the distribution lines to these output terminals can be collectively carried out.

Further, when all input terminals and output terminals are arranged in the condition the they protrude in the same direction, all connection operations for the input and output of the power source can be carried out from the same side of the power distributor, and the operability is further increased.

Further, in the structure in which each of output terminals is arranged in the condition that these output terminals protrude in the same direction, when the distributor is structured in such a manner that an element connecting portion which is extended in parallel to the arrangement direction of each output terminal, and electrically connected to the input terminal, is arranged at a position adjacent to a far end of each output terminal, and the semiconductor switching elements corresponding to these output terminals are arranged, corresponding to the arrangement of each output terminal, and one current flowing terminal of each of semiconductor switching elements is electrically connected to each of output terminals, and the other current flowing terminal is connected to the element connection portion, by a simple structure in which one current flowing terminal of each semiconductor switching element is connected to the common element connection portion, and the other current flowing terminal of each semiconductor switching element is only connected as it is to the output terminal adjacent to this, or while the thin type structure is maintained, each of semiconductor switching elements can be simply inserted between the input terminal and the output terminal.

Further, each semiconductor switching element can also be directly mounted on the element connection portion, thereby, the structure is further simplified.

The element connection portion may be a portion which is electrically connected to the input terminal, and both are structured by separate members, and for example, by welding, may also be mechanically and electrically connected, however, when the element connection portion and the input terminal electrically connected to this are integrally formed by a single metallic plate, the number of parts of the input section is reduced, and the structure can be more simplified and the thickness can be reduced.

When each of the output terminals is arranged in a smaller pitch than the arrangement pitch of each of semiconductor switching elements, a connector to connect the output terminal to an external circuit can be made a smaller size. In this case, each output terminal may have the structure which has a relay portion having the shape which respectively spreads as it goes from its protrusion end toward the current flowing terminal of each semiconductor switching element, and the structure in which the current flowing terminal of each semiconductor switching element is directly connected to the relay portion. Further, in this structure, when each output terminal is integrated with the input terminal by the resin mold, because, by the existence of the relay portion, the shape of each output terminal is the shape having a plurality of directional components, an advantage that the output terminal can be securely prevented from slipping-out from the resin mold, can also be obtained.

The shape of all output terminals may not be the same, and may be appropriately set considering that the current flowing through that terminal is large and small. For example, the large current output terminal and the small current output terminal whose width is smaller than that of the large current output terminal, may be provided. In this case, when the small current output terminal is arranged on both outsides of the large current output terminal, and the path of the relay portion of the large current output terminal is shorter than the path of the relay portion of the small current output terminal, the whole area of the metallic plate constituting both output terminals is smaller as compared to the case where the path of the relay portion of the large current output terminal with the large width is increased, and the weight of the whole power distributor is reduced by such the amount.

In the power distributor according to the present invention, it is more preferable that a fuse section which is fused when the over current occurs, is provided on the middle portion of each of output terminals. By this fusing of the fuse, the downstream side electric wires can be more securely protected from the over current. In the power distributor provided with the fuse portion as described above, a resin mold having a window for fuse to expose an area in which the fuse portion is provided, toward the outside, is molded in the molding process in the production method, then, through the window for the fuse, the middle portion of the output terminal is cut, and by a method by which the fuse portion is inserted between both end portions formed by the cutting, the distributor can be easily produced.

In the power distributor according to the present invention, it is preferable that a control circuit to control of the switching operation of each semiconductor switching element is assembled, however, in this case, when the distributor is structured in such a manner that a control circuit board and a plurality of board terminals electrically connected to the control circuit board, are provided, and the board terminals are structured by metallic plates, and arranged on the same plane as the input terminals and the output terminals, while the compactness and the thin structure are kept, the control circuit board and a plurality of board terminals electrically connected to the control circuit board, can also be added.

Further, the board terminals can be integrated with the input terminal and the output terminal by the resin mold in a simple structure, and when it is structured in such a manner that the end portion of each terminal protrudes toward the outside of the resin mold, the connection of the outer wiring to each terminal can be easily carried out.

The power distributor can be produced by a simple process by a method including: a punching process to produce an original plate in which the input terminal, output terminal and board terminal are integrally connected to each other, by punching a single metallic plate into a predetermined shape; a molding process to form the resin mold having, outside the original plate, a window for cutting to expose a connection portion of terminals in the original plate to the outside, and a window for element to expose an area portion on which the semiconductor switching element is mounted, to the outside; a cutting process to cut the connection portion through the window for cutting; and an element arranging process to arrange the semiconductor switching element in the window for element.

In this power distributor, when the distributor is provided with a cover attached to the resin mold in such a manner that it covers each of semiconductor switching elements and a circuit board, and a case to accommodate the semiconductor switching elements and the circuit board is structured by the cover and the resin mold, the structure of whole power distributor can be more simplified.

Further, in the structure in which the control circuit board is arranged in almost parallel condition to the plane at a position separated from the plane on which the input terminal, output terminal and the board terminal are arranged, and one end terminal of the board terminal is bent upwardly toward the control circuit board, and the upwardly bent end portion is connected to the control circuit board, the connection of the board terminal to the control circuit board can be carried out by a simple structure in which each board terminal is only bent upwardly in one direction. Then, this connection can be simply realized by a method to conduct the bending-upward process in which the resin mold having the window for terminal to expose one end portion of the board terminal is molded in the molding process, and after the molding process, the end portion of the board terminal is bent upwardly toward the control circuit board from the window for terminal, and a board connection process in which the control circuit board is arranged outside the resin mold, and connected to the end portion of the bent-upward terminal.

As the board terminal, the control terminal to connect the current flowing control terminal of each semiconductor switching element to the control circuit board, or a signal terminal to input and output the signal to the control circuit board from the outside, is listed.

In these terminals, for the control terminal, when it is structured in such a manner that the control terminal is arranged reciprocally with the output terminal, and one end portion of the control terminal is directly connected to the current flow control terminal of the semiconductor switching element and the other end portion is bent upward toward the control circuit board, the these control terminals can be arranged together with the output terminals regularly in a compact layout.

On the one hand, for the signal terminal, when a structure, in which the signal terminal is arranged in such a manner that one end portion of the signal terminal protrudes in the same direction, and the other terminal is bent upward toward the circuit board, and the output terminals are arranged in such a manner that the output terminals protrude in the direction reversed to the signal terminals sandwiching the semiconductor switching element between them, is applied, the connection of the outer wiring (signal wire) to the signal terminal can be collectively carried out. Further, when the direction of the signal terminal and the direction of the output terminal are reversed to each other, the dimension of the power distributor in the arrangement direction of these terminals, can be suppressed small.

In the case where both of the control terminal and the signal terminal are included, when the structure in which the control terminal is alternately arranged with the output terminal, and one end portion of the control terminal is directly connected to the current flow control terminal of the semiconductor switching element, and the other end portion is bent upwardly toward the control circuit board, is applied, and when the control circuit board is arranged at a position at which the semiconductor switching element is stepped over between the control terminal and the signal terminal, these terminals can be connected to the common control circuit board in a compact layout, while both of the control terminal and the signal terminal are regularly arranged.

According to the invention, there is provided a power distributor, which distributes the electric power from a common power source mounted in the car to a plurality of electronic units, which has: an input terminal connected to the power source; a plurality of output terminals connected to each of electronic units; a plurality of semiconductor switching elements having the first current flowing terminal provided corresponding to the output terminals and electrically connected to the input terminal, and the second current flowing terminal electrically connected to the output terminals; a case accommodating these semiconductor switching elements; and a heat radiation member provided so as to be exposed to the outside of the case, wherein each of semiconductor switching elements is mounted in a condition that a conductor board is electrically connected to the first current flowing terminal, on a common conductor board on which the each of semiconductor switching elements is electrically connected to the input terminal, and the conductor board is thermally connected to the heat radiation member.

In this structure, the source electric power inputted into the input terminal is distributed to each output terminal through the conductor board and further each of semiconductor switching elements mounted on the conductor board, and supplied from these output terminals to a predetermined electronic unit. Further, because the conductor board is thermally connected to the heat radiation member exposed to the outside of the case (in this connection, electrically, it is preferable that it is insulated through, for example, the insulation sheet), the heat generated by each of semiconductor switching elements is released to the outside through the conductor board and the heat radiation member.

That is, in this structure, because the conductor board on which each of semiconductor switching elements is mounted is commonly used as the medium in which each of semiconductor switching elements is electrically connected collectively to the input terminal, and the medium in which each of semiconductor switching elements is thermally connected collectively to the heat radiation member, the cooling of these semiconductor switching elements can be effectively conducted by the structure having small number of parts, while each of semiconductor switching elements is appropriately inserted between the input terminal and each of output terminals.

The conductor board may be a member which is electrically connected to the input terminal, and it may also be allowable that both are structured by separated members and mechanically and electrically connected by, for example, welding, however, when these input terminal and the conductor board are formed by the same one sheet of metallic plate, the number of parts is further decreased, and the structure of the power distributor is further simplified, and the thickness of the power distributor can be further reduced.

The specific layout of the input terminal and the output terminals is not particularly mentioned, and it may also be allowed that, for example, a bus bar substrate laminated by a plurality of layers as the conventional electric connection box is used, however, when these input terminals and output terminals are arranged on almost the same plane and the heat radiation member is arranged in almost parallel to the plane, the thickness of the whole body of the power distributor including the heat radiation member can be greatly reduced, while the large heat radiation area of the heat radiation member is secured, and a large degree of compactness and the reduction of the thickness can be realized.

In this connection, "arranged on the same plane" does not always means that whole portion of the whole terminals are arranged on the same plane, that is whole terminals are flat plate-like, but means that the input terminal and output terminal having the shape which is partly depart from the "same plane", are also included. For example, a shape in which a portion of the input terminals and the output terminals which are basically arranged on the same plane, is bent and forms a tab as described later, or end portions of the terminals are protruded over a plurality rows, may also be allowable.

In the present invention, the input terminals and the output terminals can also be integrated by the resin mold, and by structuring the main body of the case by the resin mold, the arrangement of each terminal can be surely fixed by the structure having the small number of parts. Further, when the window from which the conductor board is exposed to the outside, is formed in the main body of the case, and the heat radiation member having the shape to cover the almost whole surface of the case is provided on one side of the main body of the case, and the heat radiation member is structured so as to be thermally connected to the conductor board through the window, the thermal connection of the conductor board and the heat radiation member is possible, and the large heat radiation area of the heat radiation member can be secured, while the thin structure of the whole body of the power distributor is kept.

Specifically, when the system is structured in such a manner that a portion at which the heat radiation member is thermally connected to the conductor board is a base portion locally protruded to the inside of the case from the inside surface of the heat radiation member, and the base portion is inserted into the window of the case main body, and the protrusion amount of the base portion is set so that the second current flowing terminal of each of semiconductor switching elements is just positioned at the height at which the second current flowing terminal can be connected to the each of the output terminals, the second current flowing terminal of each of semiconductor switching elements mounted on the conductor board can be connected to each of the output terminals without any trouble, while the thermal connection of the heat radiation member and the conductor board is ensured.

Herein, when this system is structured in such a manner that the output terminals are laterally aligned in a row and each of the semiconductor switching elements are mounted being aligned in a row on the conductor board in the arrangement corresponding to the arrangement of these output terminals, and the base portion and the window are formed into a shape expending in parallel direction to the arrangement direction of each of the semiconductor switching elements, the window and the base portion are not formed into a complicated shape, and while the each of the semiconductor switching elements is fairly arranged, the heat radiation of these semiconductor switching elements can be collectively conducted.

Further, when a plurality of sheets of fins are formed on the rear side of the heat radiation member, and the longitudinal direction of these fins coincides with the longitudinal direction of the base portion, the whole body of the heat radiation member including the fins and the base portion can be integrally formed, for example, by the extrusion molding, and the mass productivity of the heat radiation member can be increased.

In the power distributor of the present invention, it is preferable that a control circuit to conduct the current flowing control of the semiconductor switching elements is assembled, however, in this case, when a control circuit board to control the current flowing among the current flowing terminals of each of semiconductor switching elements is arranged in the almost parallel condition to the plane, and in the separated condition from each of semiconductor switching elements, on the opposite side to the heat radiation member sandwiching the plane on which the input terminal and the output terminals are arranged, each terminal, heat radiation member, and control circuit board can be rationally arranged, and the control circuit assembled in the control circuit board can be effectively protected from the heat of each of semiconductor switching elements, while keeping the thin type structure.

According to the invention, there is a power distributor to distribute the electric power from a common power source mounted on a car to a plurality of electronic units, and the power distributor has: input terminals connected to the power source; a plurality of output terminals connected to each of electronic units; a plurality of semiconductor switching elements having the first current flowing terminal, provided corresponding to the output terminals, and connected to the input terminal, the second current flowing terminal connected to the output terminals, and the current flow control terminal into which a signal to control the current flowing between these current flowing terminals is inputted; and a control circuit to forcibly turn off the semiconductor switching element when the current flowing through any one of semiconductor switching elements exceeds a predetermined cut-off current, and a fuse portion is arranged in series with the each of semiconductor switching elements, and when the semiconductor switching elements are not normally turned off, by the fusing of the fuse portion, its downstream side circuit is protected from the over current.

In this connection, "a predetermined cut-off current" may be a predetermine value irrespective of lapse of time, or may also be a current which is set as a function of the lapse of time from the rise of the load current.

According to the structure, when the current flowing through any one of semiconductor switching elements exceeds a predetermined cut-off current, the control to forcibly turn off the semiconductor switching element, is conducted, and thereby, the continuance of the over current is prevented. Further, even when the semiconductor switching element is failed due to the over current or over heat and normal off-switching is not conducted, when the fuse portion arranged in series with this is fused, the circuits on downstream side of that (wire harness and other circuit components) are securely protected from the over current (that is, double protection).

Further, because the fuse portion may be fused only when the semiconductor switching element or its control circuit cause the operation failure and the semiconductor switching element is not normally turned off, and when the semiconductor switching element is normally operated, the circuit may be shut off by the forced turning off, the frequency at which the fuse portion is fused can be greatly lowered.

Specifically, the fuse portion may have the fusing characteristic of the larger current side than the cut off current. By the structure described above, normally, because, at the time point when the actual current exceeds the cut off current, the semiconductor switching element is surely forcibly turned off and the circuit is shut off before the fuse portion is fused, after the over current occurs, by only releasing the forced turning off condition, the power distribution circuit can be returned. Accordingly, there is no troublesomeness of the fuse replacement as the conventional electric connection box in which the fuse block is only assembled.

Further, when the fuse portion has the fusing characteristic on the larger current side than the allowable current of the semiconductor switching element itself, (that is, the minimum current in which there is a possibility that the operation failure of the semiconductor switching element occurs), the fuse portion can be prevented from being fused by the current at a level at which there is no possibility that the failure of the semiconductor switching element occurs, and the frequency of the fusing of the fuse portion can be further lowered, while the over current prevention effect is fully maintained.

As described above, in the fuse portion according to the present invention, the fusing frequency is greatly low, and because, basically the AC is not necessary, different from the fuse block assembled in the conventional electric connection box, the freedom of the design work is high, and the simplification of the structure is possible. For example, the fuse portion can be provided in the middle portion of each of output terminals.

As its specific structure, the structure is preferable in which the output terminals are formed of metallic plate, and are divided into a terminal main body portion connected to the outer circuit, and an element connection portion connected to the second current flowing terminal of the semiconductor switching element, and the fuse member having the fusing characteristic is directly connected to the terminal main body portion and the element connection potion in such a manner that the both portions are connected to each other In this structure, the fuse portion can be structured by a simple structure in which the output terminals are divided and the fuse member is only directly inserted in the divided portion. Accordingly, the structure can be more simplified and size is more reduced, as compared to a case where the fuse block as the conventional one is used.

For example, by the simple structure in which both ends of the fuse member are respectively welded to the end portion of the terminal main body portion and the end portion of the element connection portion, the fuse member can be assembled in the distribution circuit, and the structure can greatly contribute to the size reduction and the cost reduction of the power distributor.

In this connection, as described above, in the structure in which the fuse member is connected to the output terminal in the naked condition as it is, there is a possibility that the fuse member is scattered in the circumference at the time of its fusing, however, when a case accommodating the semiconductor switching elements is provided, and the structure in which, in the case, a separation portion to separate each of fuse members, protruding to the case main body side, is provided, is applied, the disadvantage in which the fragments of the fused fuse member are scattered and brought into contact with the other conductor portions and make short circuit, can be avoided.

Further, when the case is structured by a case main body in which the semiconductor switching elements are assembled, and a cover attached to the case main body so as to cover the semiconductor switching elements, and the separation portion is protruded toward the case main body side on the rear surface of the cover, and when the structure in which each of fuse members is separated from each other by the separation portion in the condition that the cover is attached onto the case main body, is applied, the attachment operation of each of the fuse members can be smoothly conducted without being interfered by the separation portion in the condition that the cover is removed from the case main body.

In the present invention, the specific layout of the input terminal and the output terminal is not particularly mentioned, however, the structure in which the input terminals and the output terminals are formed of the metallic plate, and these terminals are arranged aligning on the same surface perpendicular to the thickness direction, is applied, the thickness of the whole body of the power distributor can be greatly reduced, thereby, the large degree of compactness and the reduction of the thickness can be realized.

Further, when the control terminals connected to the current flow control terminals of the semiconductor switching elements are provided, the structure in which the control terminals, input terminals and output terminals are formed of the metallic plate, and are arranged aligning on the same plane perpendicular to the thickness direction, may be allowed.

In this connection, "arranged on the same plane" does not always means that whole portion of all terminals are arranged on the same plane, that is, all terminals are limited to the planer shape one, but, means that the input terminals and output terminals include also the terminals partly having the shape depart from the [same plane]. For example, a part of the input terminals or output terminals may be bent and formed into the tab, which will be described later, or the shape in which the end portions of the terminals are protruded in a plurality of rows, may also be allowable.

In the above structure, when the control circuit board on which the control circuit is assembled, is arranged in almost parallel condition to the plane on which the input terminals, output terminals and control terminals are aligned, and the input terminals, output terminals and control terminals are electrically connected to the control circuit board, the control circuit can be rationally assembled in it while the thin type structure is maintained.

As described above, in the structure in which the input terminal, output terminal, and control circuit are connected to the control circuit board, the system can be structured in such a manner that the control circuit calculates a value corresponding to the current flowing through each of the semiconductor switching elements according to the difference of the voltage of the input terminal and the voltage of the output terminal, and when this value exceeds the cut-off current, the control signal to forcibly turn off the semiconductor switching element is outputted to the current flow control terminal of the semiconductor switching element through control terminal, thereby, by the simple circuit connection, the adequate forced turning off control of each of the semiconductor switching elements can be realized.

Further, in the structure in which each of terminals is arranged on the same surface, these terminals can be integrated by the resin mold, and when the case main body is structured by the resin mold, the arrangement of each of terminals can be surely fixed by the structure having small number of parts.

In that case, when the structure in which a window to expose the middle portion of each of output terminals is formed in the case main body, and the fuse portion is provided on the terminal portion exposed from the window, is applied, the fuse portion can be introduced at an adequate portion of the output terminal without any trouble, while the each terminal is integrated.

BRIEF DESCRIPTION OF THE DRAWINGS

FIG. 4A is a sectional front view of the power distributor, and FIG. 4B is an enlarged sectional view of a FET mounting portion.

FIG. 5A is a sectional front view showing a fuse portion in the power distributor, and FIG. 5B is a sectional view taken on line A—A of FIG. 5A.

DETAILED DESCRIPTION OF THE PRESENT INVENTION

The present invention will be described in detail with reference to the accompanying drawings.

Figure 1:
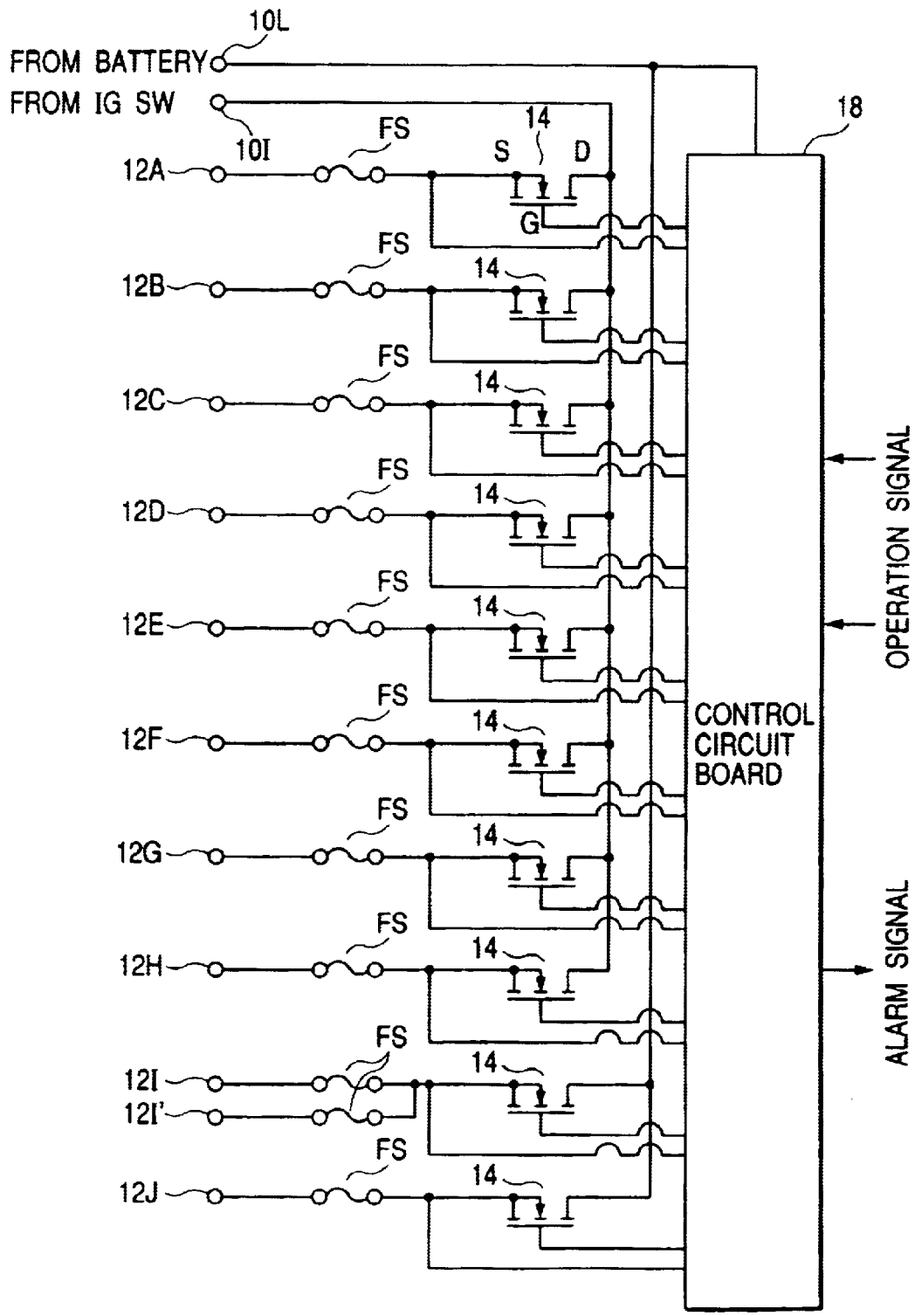
FIG. 1 is a circuit diagram of a power distributor according to an embodiment of the present invention.

Initially, referring to FIG. 1, a circuit structure of a power distributor according to an embodiment will be described.

The power distributor comprises a first input terminal 10I and a second input terminal 10L, a plurality of (11 in number in FIG. 1) output terminals 12A, 12B, 12C, 12D, 12E, 12F, 12G, 12I, 12I', 12J, a plurality (10 in number in FIG. 1 of semiconductor switching elements (in the drawing, power MOSFET 14, hereinafter, simply referred to as "FET"), and a control circuit board 18.

The input terminals 10I, and 10L are connected to a common car-power source (for example, a battery), and the first input terminal 10I is connected to the car-power source through an ignition switch, and the second input terminal 10L is connected to the car-power source through a lamp switch.

In the output terminals 12A–12J, the output terminals 12A–12H are respectively connected to electronic units (for example, a center cluster unit, an air conditioner unit, a door unit) to receive the power feeding by the operation of the ignition switch, and the remaining output terminals 12I, 12I', and 12J are connected to an electronic unit to receive the power feeding by the operation of the lamp switch, that is, a lamp unit.

On a middle portion of each of the output terminals 12A, 12B, 12C, 12D, 12E, 12F, 12G, 12H, 12I, 12I', and 12J, a Fuse portion FS being fused when the over current occurs is provided.

A source terminal (a common terminal) of each FET 14 is respectively connected to the output terminals 12A, 12B, 12C, 12D, 12E, 12F, 12G, 12H, 12I, and 12J, and the source terminal of the FET 14 connected to the output terminal 12I is simultaneously connected also to the output terminal 12I'. That is, the common FET 14 is connected to both output terminals 12I and 12I'.

In these FETs 14, all drain terminals (current flow terminals) of the FETs 14 connected to the output terminals 12A–12H are connected to the first input terminal 10I In contrast thereto, all drain terminals of the FETs 14 connected to the output terminals 12I, 12I', and 12J, are connected to the second input terminal 10L. Accordingly, the source electric power inputted into the first input terminal 10I is distributed to the electronic units connected to each of the output terminals 12A–12H through each of the FETs 14, and on the one hand, the source electric power inputted into the second input terminal 10L is distributed to the electronic units connected to each of the output terminals 12I, 12I' and 12J through each of the FETs 14.

All gate terminals (current flow control terminal) of each of the FETs 14 are connected to the control circuit of the control circuit board 18. The source voltage applied to the second input terminal 10L and the source voltage of each of the FETs 14 are inputted into the control circuit. This control circuit is structured in such a manner that it conducts the current flow control of each of the FETs 14 according to an operation signal (switch signals) inputted from the outside, and detects the current flowing through the FET 14 from the voltage difference between the source voltage (the voltage of the input terminal 10L) and the source voltage (the voltage of the output terminals 12A–12J) of each of the FETs 14, and when the current exceeds a predetermined cut-off current (current threshold value), the FET 14 is forcibly turned off, and an alarm signal is outputted to a display apparatus, not shown.

On the one hand, the fusing characteristic in each of fuse portion FS, is set on the larger current side than the threshold value (cut-off current)of the current by which each of the FETs 14 is forcibly tuned off, and even when the FET 14 is failed and the off switching can not be operated in the FETs 14, the fuse portion FS arranged in series on its downstream side is fused, thereby, the over current is prevented from continuing to flow.

Figure 15:
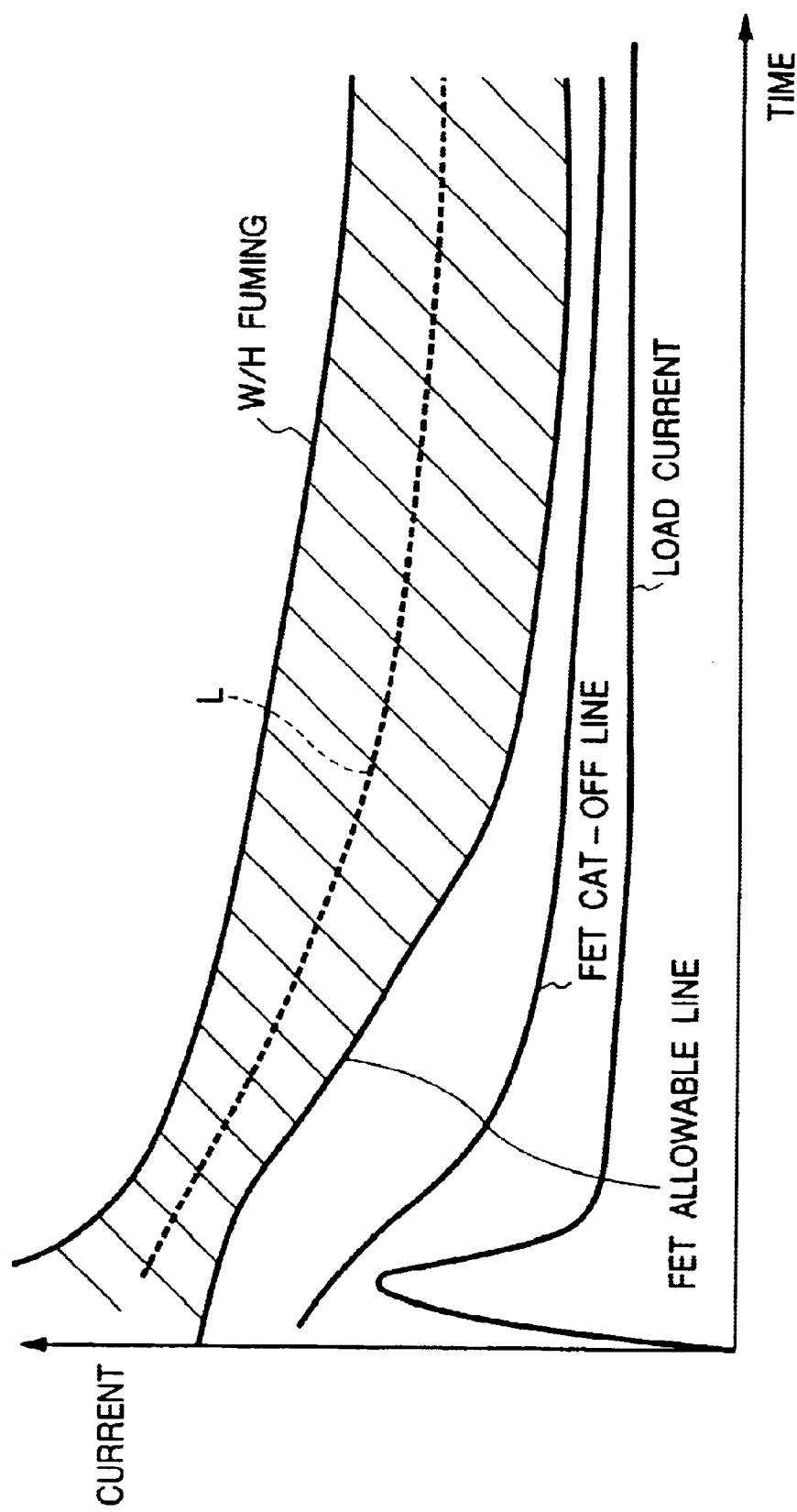
FIG. 15 is a graph showing an example of the design of the fusing characteristic of the fuse portion.

Its specific example of the design is shown in FIG. 15. As shown in FIG. 15, the load current in the steady state suddenly rises from the turning-on, and after that, drops and converges into almost an constant value. The FET cut-off line (the line of the current threshold value to forcibly turn off the FET 14; the maximum line of the cut-off current) is set as a function of time period so that it always larger than the load current line, and the FET allowable line (the allowable current of the FET 14 itself, that is, the maximum current by which the steady state of the FET 14 can be secured) exists in a higher position.

In the present invention, the fusing characteristic of the fuse portion FS (generally, time-current characteristic) is, for example, as shown by a broken line L, it is preferable that it is set so as to be in the area on the larger current side than the FET allowable line, and in the area on the smaller current side (the slanting line area in the drawing) than the limit current line by which the fuming of the wire harness connected to the output terminal can be avoided. By this setting, even when the FET 14 is failed and can not be normally operated, because the fuse section FS is fused before the fuming of the wire harness is generated, the wire harness can be effectively protected from the over current. Reversely, when the FET 14 is normally turned off, because the circuit is cut off by the forced turning-off control of the FET 14 before the fuse portion FS is fused, the frequency of the fusing of the fuse portion FS is very low. Accordingly, when the fuse portion FS is designed, it is not necessary that its exchangeability is considered, as a result, for example, as described above, the fuse portion FS can be made a greatly simple and low cost structure.

As described above, as the area where the fusing characteristic of the fuse portion FS is set, the above slanting line area is ideal, however, when the fusing characteristic is set at least in the area on the upper side than the FET cut-off line (on the larger current side than the cut-off current), it can be prevented that, although the FET 14 can be normally turned off, the fuse portion FS is fused before the turning off.

Next, referring to FIG. 2–FIG. 8, the specific structure of the power distributor for realizing the distribution circuit will be described.

Figure 2:
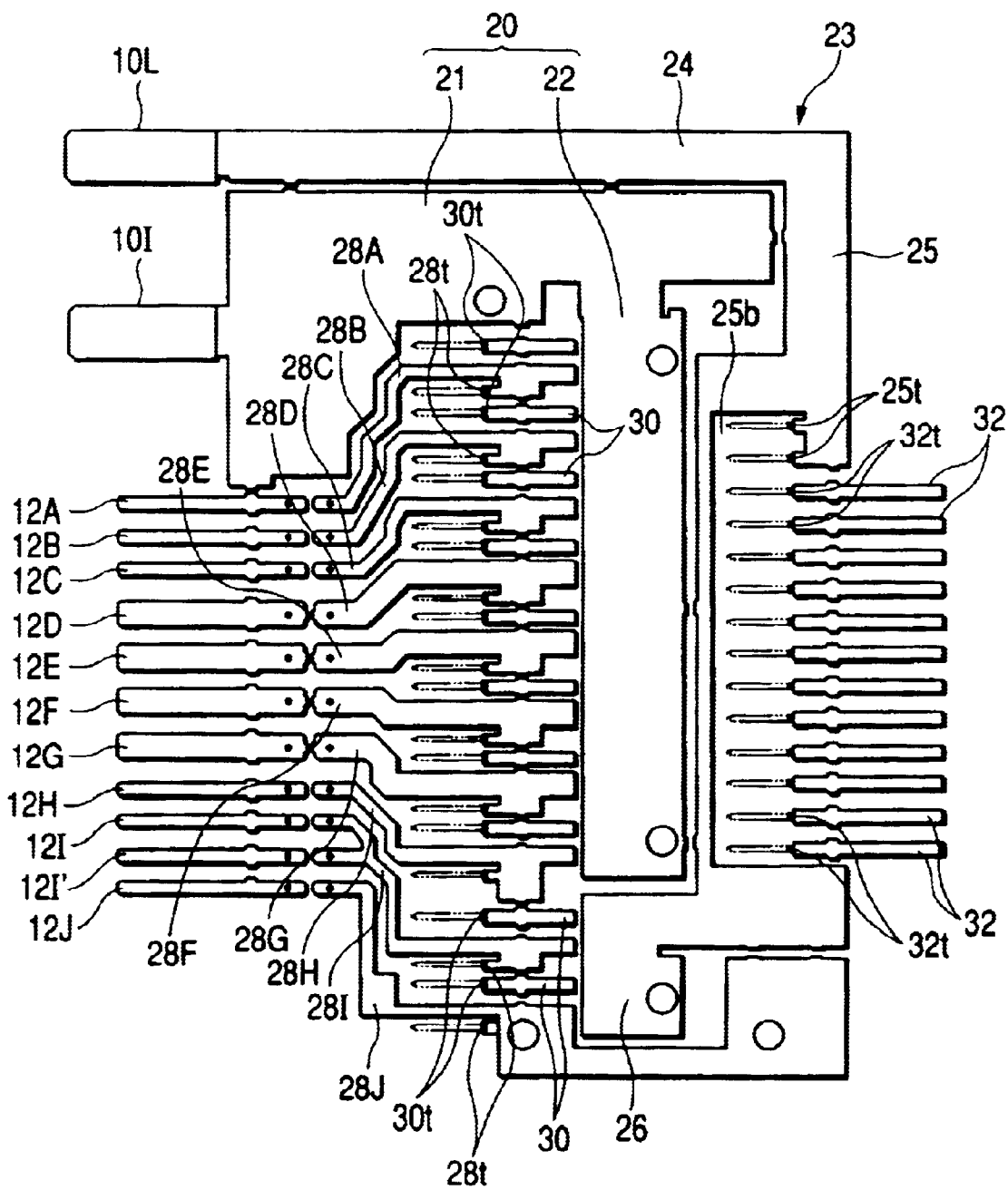
FIG. 2 is a plan view showing a conductor portion of the power distributor.
Figure 3:
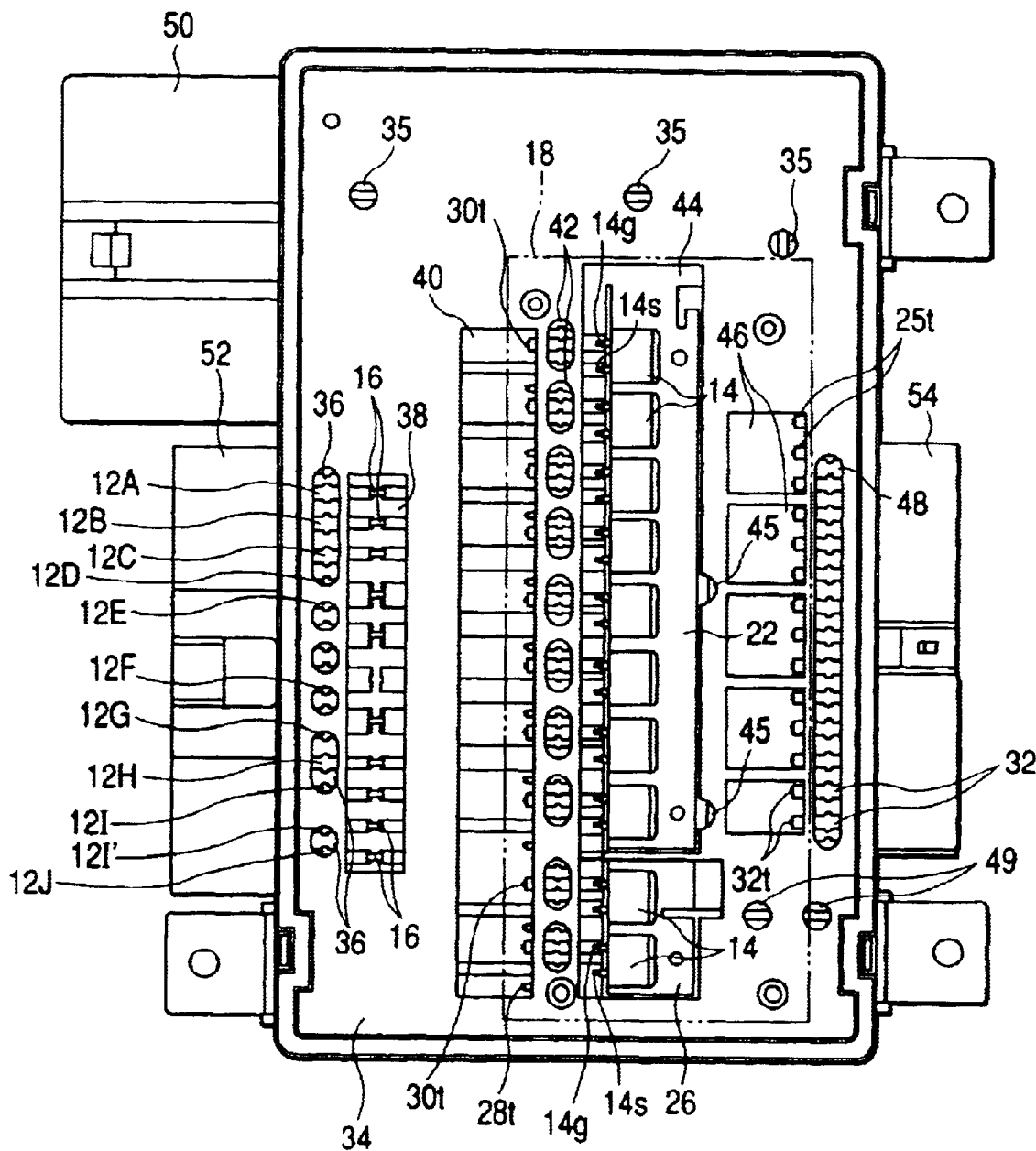
FIG. 3 is a plan view of the whole body of the power distributor.
Figure 6:
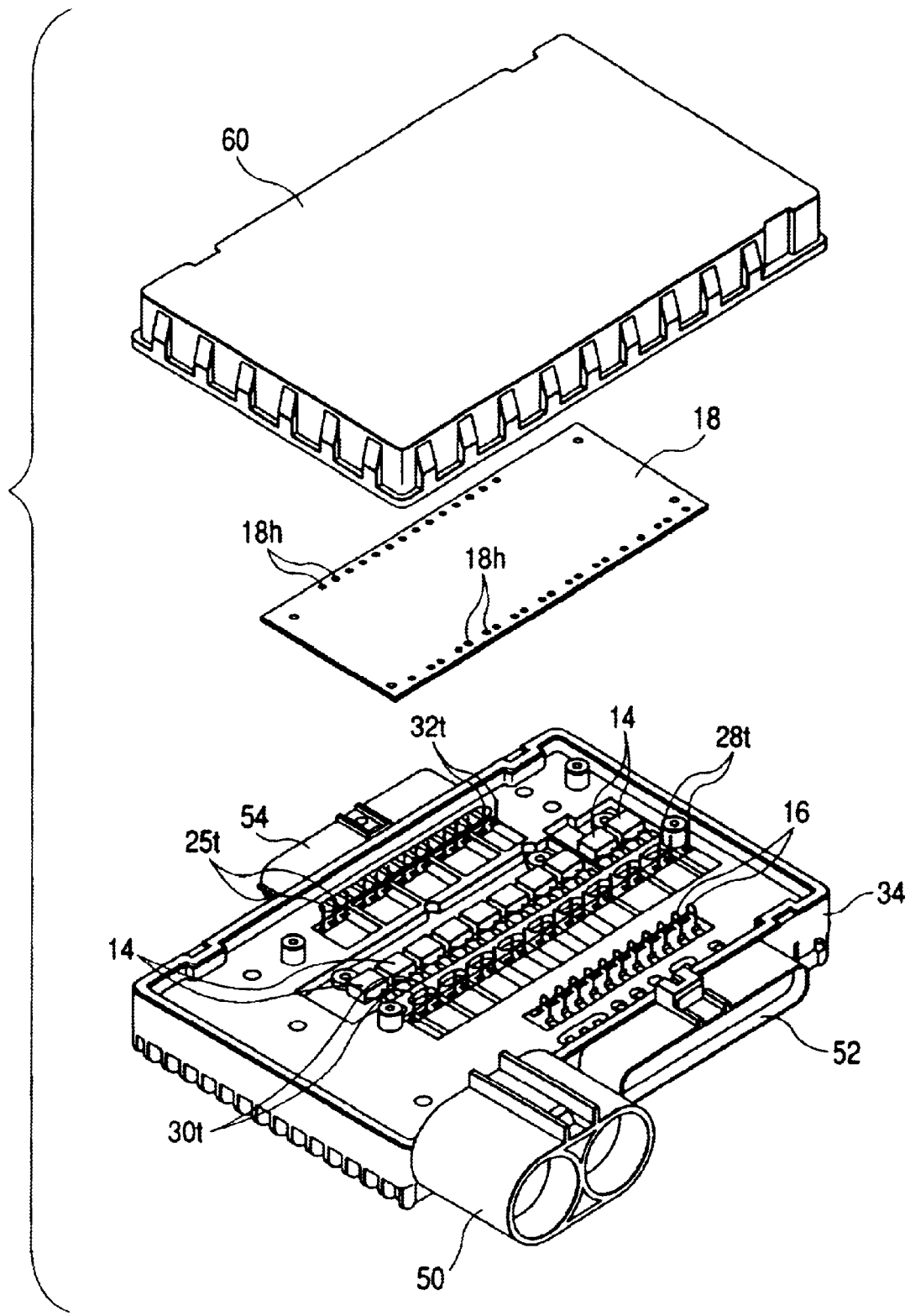
FIG. 6 is an exploded perspective view in which the power distributor is viewed from above.

In the power distributor, all of the conductors forming the distribution circuit are structured by metallic plates, and these metallic plates are arranged on the same plane perpendicular to the thickness direction, and integrated by the resin mold. FIG. 2 is a plan view showing only the portion structured by the metallic plates, by looking through the resin mold.

As shown in FIG. 2, the first input terminal 10I and the second input terminal 10L are integrally formed at the end portions of metallic plates 20 and 23, respectively. In FIG. 2, for securing the plate thickness, both of the input terminals 10I and 10L are formed in such a manner that the end portions of each of the metallic plates 20 and 23 are respectively folded in two, and arranged in the condition that these terminals adjoin each other in the lateral direction (up and down direction in FIG. 2), and protrude in the same direction (left direction in FIG. 2).

The metallic plate 20 is integrally formed with a relay portion 21 extending from the first input terminal to the far side (right side in FIG. 2) and a drain connection portion 22 extending from the far end of the relay portion 21 to the direction perpendicular to the relay portion 21.

The metallic plate 23 is integrally formed with a first relay portion 24 extending in parallel to the relay portion 21 through the outside (upper side in FIG. 2) of the relay portion 21 of the metallic plate 20 from the second input terminal 10L, a second relay portion 25 extending in parallel to the drain connection portion 22 through the outside (right side in FIG. 2) of the drain connection portion 22 from the far end of the first relay portion 24, and a drain connection portion 26 extending from the end of the second relay portion 25 to the front side. The drain connection portion 26 and the drain connection portion 22 are aligned in a row along the longitudinal direction (up and down direction in FIG. 2) of the drain connection portion 22.

All output terminals 12A–12J are aligned in a lateral row with both the input terminals 10I and 10L, and protrude in the same direction as these input terminals 10I and 10L. In the output terminals 12A–12J, the output terminals 12A–12C and the output terminals 12H–12J, which are on the outside of the alignment direction, are formed into the small width small current output current terminals, and the output terminals 12D–12G which are on the middle of the alignment direction, are formed into the large current output terminals whose width is larger than that of the small current output terminal. That is, the small current output terminals 12A–12D and 12H–12J are arranged on both outsides of the large current output terminals 12D–12G.

The rear portions of each of the output terminals 12A, 12B, 12C, 12D, 12E, 12F, 12G, 12H, 12I and 12J are relay portions 28A, 28B, 28C, 28D, 28E, 28F, 28G, 28H, 28I, and 28J which extend to positions adjacent to the drain connection portions 22 and 26. These relay portions 28A–28J have a shape whose pitch respectively spreads as these go to the rear side (as these approach to the drain connection portions 22 and 26) Further, the output terminal 12I' branches from the relay portion 28I of the output terminal 12I. That is, both of output terminals 12I and 12I' has the common relay portion 28I.

Accordingly, the rear ends of the output terminals 12A–12J (that is, the rear ends of the relay portions 28A–28J) are arranged with the larger pitch than the pitch of the top end side of these output terminals 12A–12H. Then, in the relay portions 28A–28J, the drain connection portion 22 is arranged at a position adjacent to the far side of the relay portions 28A–28H, and the drain connection portion 26 is arranged at a position adjacent to the far side of the relay portions 28I and 28J. Further, because the large current output terminals 12D–12G are arranged at the middle of the arrangement direction, the path of the relay portions 28D–28G is shorter than the path of the relay portions 28A–28C and 28H–28J of the small current output terminals 12A–12C, and 12H–12J arranged on both outsides.

Further, a control terminal 30 formed of almost a strip-like metallic plate is arranged at a position adjacent to each of the relay portions 28A–28J. That is, the relay portion and the control terminal are laterally arranged in a row reciprocally with each other, in a manner of the control terminal 30, relay portion 28A, control terminal 30, relay portion 28B, control terminal 30, etc.

In each of the output terminals 12A–12J, the relay portions 28A–28J and the terminal main body portion in the front of them are separated from each other, and the fuse portions FS are arranged at the separated portions.

Specifically, as shown in FIGS. 5A and 5B, the fuse members 16 are arranged in such a manner that the end portions formed by the separation are connected to each other. The middle portion 16a of the fuse member 16 is bent into almost U-shape facing upwardly in a convex shape, with a small width, and is designed so as to have the fusing characteristic described in FIG. 15. On the one hand, both ends 16b of the fuse member 16 are folded back to a position facing the horizontal direction, and jointed by the welding (for example, resistance welding, or laser welding), to fold these both ends 16b on end portions formed by the separation, respectively (that is, the end portions of the terminal main body portion which is top end side portions of the output terminals 12A–12j and end portions of the relay portions 28A–28J).

In the terminals of each FET 14, the drain terminal (not shown) is formed on the rear surface of the chip main body, and the source terminal 14s and the gate terminal 14g protrude in the same direction from the chip main body. Each of the FETs 14 is arranged on the drain connection portions 22 and 26 corresponding to the arrangement and the pitch of the relay portions 28A–28J, and the FETs 14 are mounted on the drain connection portions 22 and 26 by the welding (for example, soldering) in the condition that the drain terminals of the FETs 14 are brought into direct contact with the drain connection portions 22 and 26, and the source terminals 14s of each of FETs 14 are electrically connected to the rear ends of each of the relay portions 28A–28J, and the gate terminals 14g are electrically connected to the rear ends of each of control terminals 30, respectively by the soldering.

Claw portions are branched from the rear portions of the relay portions 28A–28J, and when these claw portions are bent upwardly, tabs 28t are formed. In the same manner, the claw portions are also formed on the front portions of each of control terminals 30, and by being bent upwardly, the tabs 30t are formed.

In the second relay portion 25 on the metallic plate 23, a rectangular cutout 25b extending in parallel to the drain connection portion 22 is formed, and in the space of this cutout 25b, a plurality of signal terminals 32 are arranged. Each of the signal terminals 32 has a small width strip shape, and is aligned laterally in a row in the direction parallel to the longitudinal direction of the drain connection portion 22, and protrudes in the reversal direction (right direction in FIG. 2) to the input terminals 10I and 10L and the output terminals 12A–12J. The rear portions of these signal terminals 32 are also formed into claw portions, and the claw portions are bent upwardly to form tabs 32t.

Further, also in the second relay portion 25, claw portions are formed at a portion adjacent to the signal terminals 32, and these are bent upwardly to form tabs 25t. All of the tab 25t, 28t, 30t, and 32t are connected to the common control circuit board 18.

The control circuit board 18 is, as shown in FIG. 4, arranged in the condition almost parallel to the plane on which each of the terminals are arranged, (almost horizontal condition in the drawing), at a position just above the FET 14, namely apart from the FET. When each of the tabs 28t, 30t, 32t, and 25t are, for example, soldered under the condition that these are inserted into the through holes, not shown, provided in the control circuit board 18, these tabs and the control circuit board 18 are mechanically connected, and each of the output terminals 12A–12J, each of the control terminals 30, each of th signal terminals 32, and the second input terminal 10L are electrically connected to the control circuit assembled in the control circuit board 18. That is, the control circuit board 18 is arranged at a position at which the FET 14 is stepped over between the control terminal 30 and the signal terminal 32.

Next, a resin mold for integrating each terminals will be described.

The resin mold structures a case main body 34 of the power distributor to accommodate the FET 14 and control circuit board 18, together with the cover 60, which will be described later.

In appropriate portions of the case main body 34, a plurality of windows are formed which penetrate therethrough in the thickness direction. Specifically, a rectangular window 38 for the fuses which exposes the separation portion of each of the output terminals 12A–12J to both the sides of the upper and lower sides, and a window 44 for elements which exposes each of the drain connection portions 22 and 26 respectively to both sides of the upper and lower sides, are formed. Each of the fuse portions 16 are arranged in the window 38 for fuses, and the mounting onto the drain connection portions 22 and 26 of each of the FETs 14 is carried out in the window 44 for elements (the other windows will be described later).

On one side surface of the case 34, the connector housing portions 50 and 52 are integrally formed, and on the other side surface, the connector housing portion 54 is formed. These connector housing portions 50, 52 and 54 are formed into a hood-shape whose opening spreads toward the outside. The formation of the case 34 is conducted in such a manner that, in the connector housing portion 50, both input terminals 10I and 10L protrude in the condition that they adjoin each other laterally, and in the connector housing portion 52, all of the output terminals 12A–12J protrude in the condition to adjoin each other laterally, and in the connector housing portion 54, all of the signal terminals 32 protrude to adjoin each other laterally. That is, each of terminals 10I, 10L, 12A–12J, and 32 which protrude to the outside of the case main body 34, forms a male terminal of the connector which is integrally formed with the case main body 34.

The connector housing portion 50 has a shape which can engage with the connector provided on the end of the wire harness for power input, not shown, and by the engagement, each of the input terminals 10I and 10L in the connector housing 50 is electrically connected to the car mount power source through the wire harness for power input.

In the same manner, the connector housing portion 52 has a shape which can engage with the connector provided on the end of the wire harness for power distribution, not shown, and by the engagement, each of the output terminals 12A and 12J in the connector housing 52 is respectively electrically connected to appropriate the electronic units through the wire harness for power distribution.

Further, the connector housing portion 54 has a shape which can engage with the connector provided on the end of the wire harness for signal, not shown, and by the engagement, a portion of the signal terminals 32 in the connector housing portion 54 is connected to electronic units (for example, the center cluster unit) transmitting the operation signal, and a portion of the remaining signal terminals 32 is connected to the electronic units (for example, the center cluster unit having the display function, or meter unit) conducting the alarm display operation.

On the rear surface of the case main body 34, (the surface reversed to the surface on which the FETs 14 are mounted, namely opposite to the surface on which the control circuit board 18), a heat radiation member 56 is arranged over almost the entire surface (in the drawing, an area excluding the peripheral portion).

Figure 7:
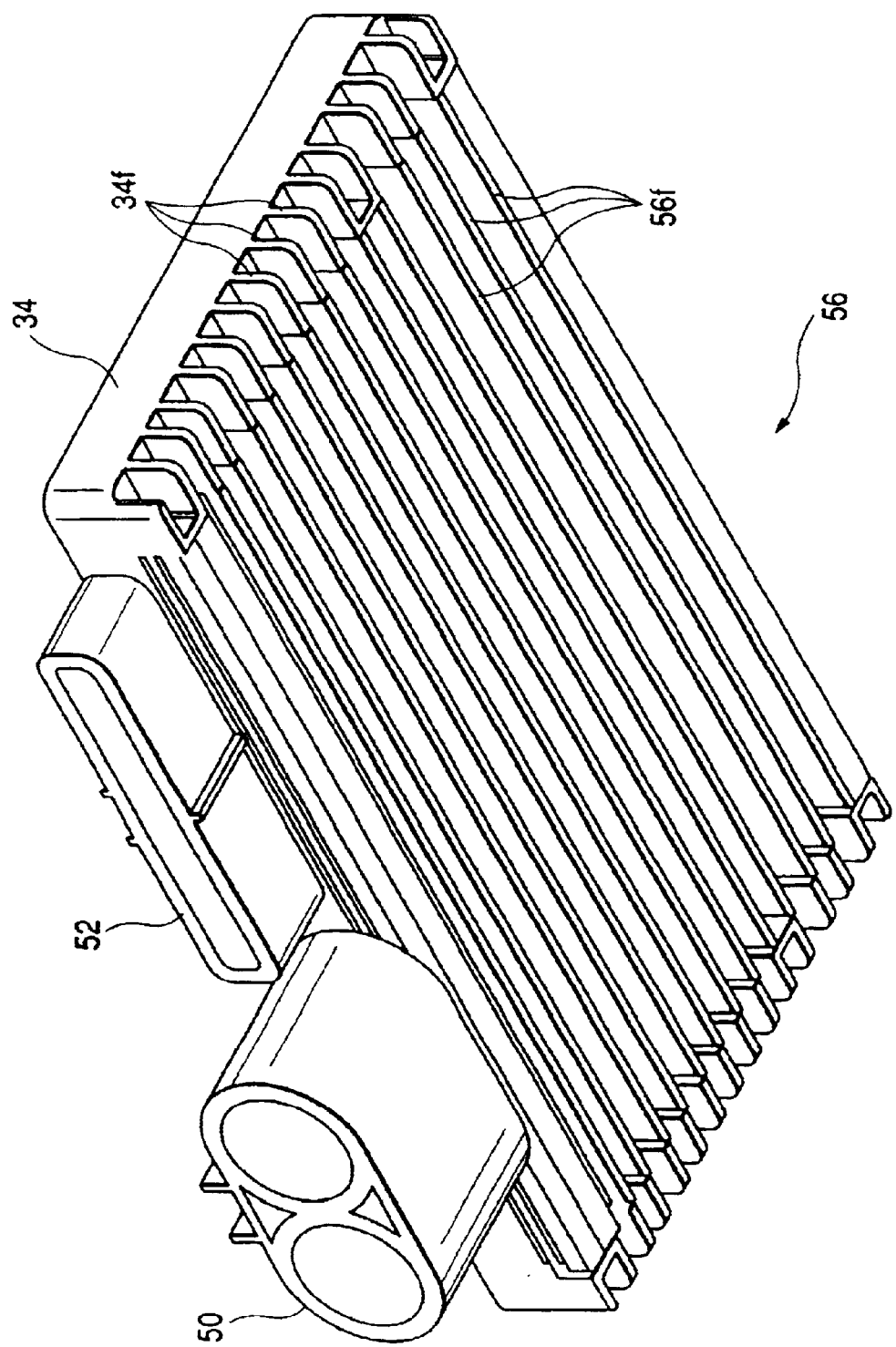
FIG. 7 is a perspective view of the power distributor viewed from the lower side.
Figure 8A:
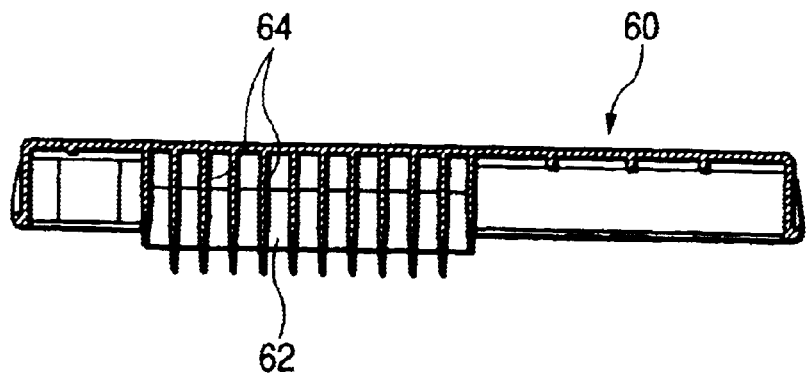
FIG. 8A is a sectional front view showing a cover of the power distributor.
Figure 8B:
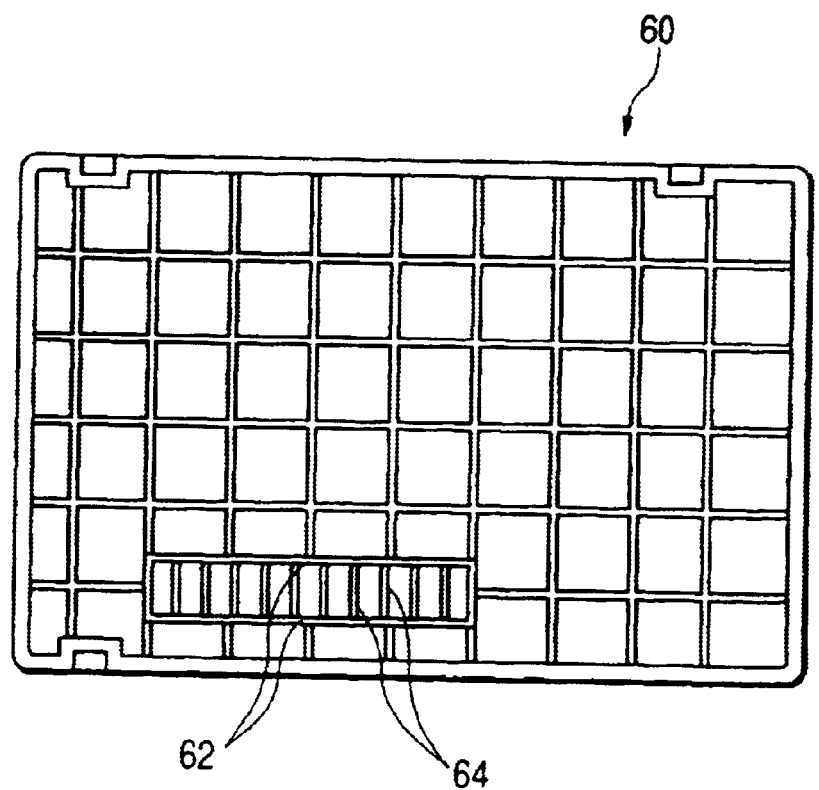
FIG. 8B is a bottom view of the cover.

The heat radiation member 56 is a member whose whole body is integrally formed of a high heat conductivity (or high specific heat) material such as, for example, aluminum alloy, and in the drawing, a material whose whole body is integrally formed by extrusion molding, is used. On the surface from which the heat radiation member 56 is exposed outside, (in FIGS. 4A and 4B, the lower surface), many number of fins 56f extending in the direction parallel to the arrangement direction (in FIGS. 4A and 4B, the far side direction) of the FETs 14, are formed, and on the one hand, on the peripheral portion of the case main body 34, fin covers 34f whose shape is continuous to each of fins 56f, are formed, as shown in FIG. 7, and both ends portions of each of fins 56f are covered from the sides by these fin covers 34f.

On the one hand, on the inside surface (in FIG. 4, the upper surface) of the heat radiation member 56, a base portion 56h extending to the direction parallel to the arrangement direction of the FETs 14 is protruded facing upward. In contrast to this, on the lower surface of the case main body 34, the window 43 extending to the arrangement direction of the FETs 14 including the widow for elements 44 is formed, and in the window 43, the base portion 56h is inserted into the window for elements 44 of the case main body 34 from the lower side, and the rear surface of the drain connection portions 22 and 26 is thermally connected to the surface of the base portion 56f through an insulation sheet 58 (FIG. 4B) formed of silicon. Accordingly, the dimension of the height h of the base portion 56h is set to the dimension at which the source terminal 14s and the gate terminal 14g of each of the FETs 14 mounted on the drain connection portions 22 and 26 thermally connected to the base portion 56h are just positioned at the height at which these terminals can be connected to the output terminals 12A–12J and the control terminal 30.

The peripheral portion of the cover 60 can be attached onto the front side surface (in FIG. 4, the upper surface) of the case main body 34, and has the shape to cover the FETs 14 and the control circuit board 18 from the outside under the attachment condition. Further, at an appropriate portion inside surface of the cover 60, a pair of longitudinal partition walls 62 extending to both sides of the Fuse portion FS and lateral partition walls 64 which partitions the space between both longitudinal partition walls 62 into the same number as the number of the fuse portions 16, are formed. The position and the shape of both partition walls 62 and 64 are set so that, as shown in FIG. 4, under the condition that the cover 60 is attached onto the case main body 34, as shown in FIG. 5A, the longitudinal partition wall 62 separates each of fuse portions 16 from the space of both outsides, and as shown in FIG. 5B, each of the lateral partition walls 64 separates each of the fuse portions 16 from each other. That is, by both partition walls 62 and 64, a separation portion to individually separate each of the fuse portions 16, is structured.

According to the structure of the power distributor as described above, the following effects can be obtained.

Because all of the input terminals 10I and 10L, output terminals 12A–12J, control terminal 30 and signal terminal 32 are structured by metallic plates, and arranged on the same plane (in the drawing, on the horizontal surface) perpendicular to the thickness direction, the thickness of whole power distributor is greatly reduced, and so much compactness and thickness reduction can be realized.

Each of terminals is integrated by the resin mold by a simple structure. Further, the resin mold structures the case main body 34, and the structure is greatly simple. Further, because the end portion of each terminal is protruded outside the case main body 34, the connection of the wire harness to each of input terminals 10I and 10L, output terminals 12A–12J, and signal terminal 32 can also be simply carried out.

As the input terminal, because the first input terminal 10I connected to the car mount power source through the ignition switch, and the second input terminal 10L connected to the car mount power source through the lamp switch are provided together, the power distribution to electronic units to which the electric power is to be fed by the operation of the ignition switch and the power distribution to electronic units (lamp units) to which the electric power is to be fed by the operation of the lamp switch can be respectively independently and appropriately carried out. Further, because both input terminals 10I and 10L are arranged at a position adjacent to each other and simultaneously connected to the common connector, the connection operation of the wire harness to both input terminals 10I and 10L can be collectively carried out. This effect is the same as also the case for the output terminals 12A–12J and signal terminal 32.

Further, because the input terminals 10I and 10L and the output terminals 12A–12F are aligned laterally in a row in the condition that they protrude in the same direction, and the signal terminal protrudes in the reversed direction to that, the treatment of the power source wire harness and the signal wire harness to these terminals is simple, and the wiring around the power distributor can also be simplified. Further, all of the connection operation about the input and output of the power source can be carried out from the same side of the power distributor, and the operability is further increased. Further, because the signal terminal 32 is protruded to the reversal direction to the input and output terminal, dimension in the terminal arrangement direction (the dimension in the upward and downward direction, in FIG. 2 and FIG. 3) can be suppressed to a smaller dimension as compared to the case where all terminals are arranged in the same direction.

Because the drain connection sections 22 and 26 connected to the input terminals 10I and 10L are connected to the relay portions 28A–28J of each of output terminals 12A–12J, and the drain terminals of each of FETs 14 are commonly connected to these drain connection portions 22 and 26, and the source terminals of each of FETs 14 are connected to each of relay portions 28A–28J, each of FETs 14 can be inserted between the input terminal and the output terminal while the thin-type structure is maintained. Further, because each of FETs 14 is directly mounted onto each of the drain connection portions 22 and 26, the structure is further simplified, and the reduction of the thickness is further promoted. Particularly, in the power distributor shown in the drawing, because the drain connection portion 22 and the input terminal 10I, and the drain connection portion 26 and the input terminal 10L are respectively formed of a single metallic plate, the number of parts of the input portion is small, and the structure is further simplified and the thickness is further reduced.

Because the pitch on the protrusion end side of the output terminals 12A–12J is made smaller than the arrangement pitch of the FETs 14, the size of the connector connected to these output terminals 12A–12J is reduced. Further, because the relay portions 28A–28J of each of output terminals to connect the protrusion ends to the FETs 14 have the shape having a plurality of directional components (that is, the shape except the shape linearly extending to the front and the back directions), the output terminals can be securely prevented from slipping off from the resin mold (case main body 34). Further, because the small current output terminals 12A–12C and 12H–12J are arranged on both outsides of large current wider output terminals 12D–12G, and the path of the relay portions 28D–28G of the former is shorter than the path of the relay portions 28A–28C, 28H–28J of the latter, the whole area of the metallic plate constituting the whole output terminals is reduced, and the weight of the whole power distributor is reduced by the amount.

Because the fuse portion FS to be fused when the over current occurs, is provided on the middle portion of each of output terminals 12A–12J, the downstream side electric wires can be securely protected from the over current Further, even when the over current control function is provided to the FETs 14, or even when the FETs 14 are failed and can not be operated, there is an effect in which the over current can be securely prevented.

When the tabs 28t, 30t, 32t, and 25t are bent upwardly in the same direction from each of terminals, each terminal can be connected to the common circuit board 18 by a very simple structure.

Because the control terminals 30 are aligned in a row reciprocally with each of relay portions 28A–28J, these terminals can be regularly arranged in a compact layout, and in addition to that, the mounting of the FETs 14 can also be very easily carried out.

Because the control circuit board 18 is arranged at a position at which each of FETs 14 are stepped over, between the control terminal 30 and the signal terminal 32, these terminals can be connected to the common control circuit board 18 in a compact layout, while each of terminals 30 and 32 is regularly arranged.

In the power distributor described above, because each of FETs 14 are connected to the drain connection portions 22 and 26 electrically connected to the input terminals 10I and 10L, and the drain connection portions 22 and 26 are thermally connected to the base portion 56h of the heat radiation member 56, the drain connection portions 22 and 26 play both of a roll as the medium to electrically connect the each of FETs 14 collectively to the input terminals 10I and 10L, and a roll as the medium to thermally connect each of the FETs 14 collectively to the heat radiation member 56. Accordingly, both of the collective electrical connection of each of FETs 14 to the common input terminal, and the effective cooling of each of FETs 14 can be realized by a simple structure having a small number of parts.

By the existence of the separation portion, as described above, even when the fuse members 16 are assembled in the output terminals 12A–12J in the naked condition, it can be surely prevented that the fragments of the fused fuse members 16 are scattered and brought into contact with other conductors (for example, adjoining fuse members 16 or output terminals) and cause the short circuit. Further, because the separation portion is provided on the cover 60 side, in the condition that the cover is removed, the fuse members 16 can be easily mounted on output terminals 12A–12J.

Further, this power distributor can be easily produced by a simple process, for example, by a method including the following processes.

(1) Punching Process

By punching a single metallic plate by, for example, a press into a predetermined shape, an original plate in which all of metallic plates 20 and 23 including the input terminals 10I and 10L, output terminals 12A–12J, and their relay portions 28A–28J, control terminal 30, and signal terminal 32 are integrally connected to each other, is produced.

Figure 9:
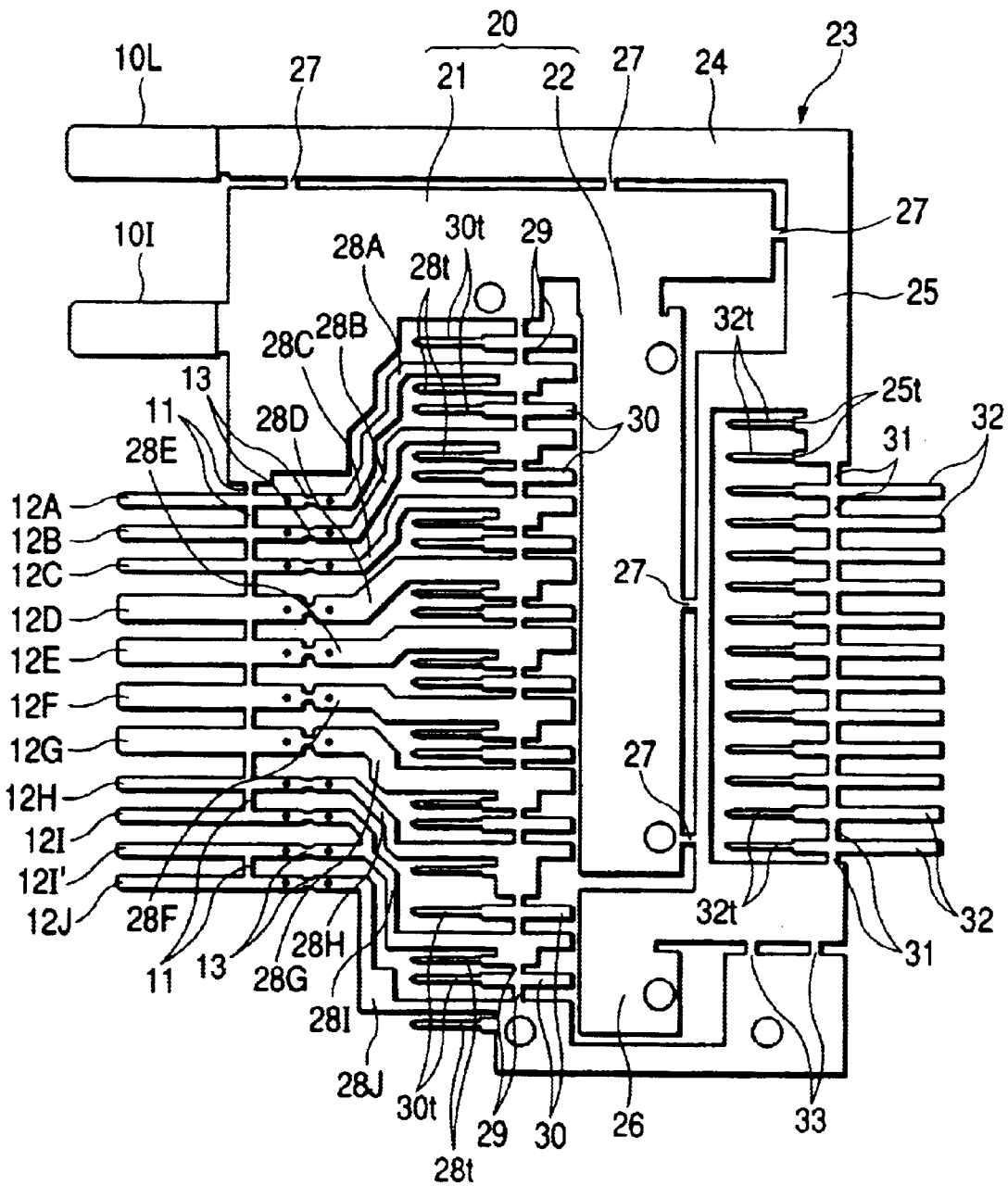
FIG. 9 is a plan view showing the shape of the original plate punched out by a punching process in a production method of the power distributor.

Specifically, the original plate as shown in FIG. 9 is produced. In the original plate, a small width connection portion 27 connecting both of the metallic plates 20 and 23, a small width connection portion 11 connecting between the metallic plate 20 and the output terminal 12A, and all of the output terminals, a small width connection portion 13 connecting among the terminal main body portions of the top end side of each of output terminals 12A–12J and the relay portions 28A–28J, a small width connection portion 29 connecting between the metallic plate 20 and a control terminal 30, and between the control terminal 30 and relay portions adjacent to it, a small width connection portion connecting between the metallic plate 23 and a signal terminal 32, and between both of signal terminals 32, and a small width connection portion 33 connecting the metallic plate 23 to the relay portion 28J of the output terminal 12J, are formed, and by these connection portions, the whole body is integrated. Further, claw portions corresponding to the tabs 28t, 30t, 32t, and 25t, are previously formed on the relay portions 28A–28J, control terminal 30, signal terminal 32, and the second relay portion 25 of the metallic plate 23.

(2) Molding Process

Figure 10:
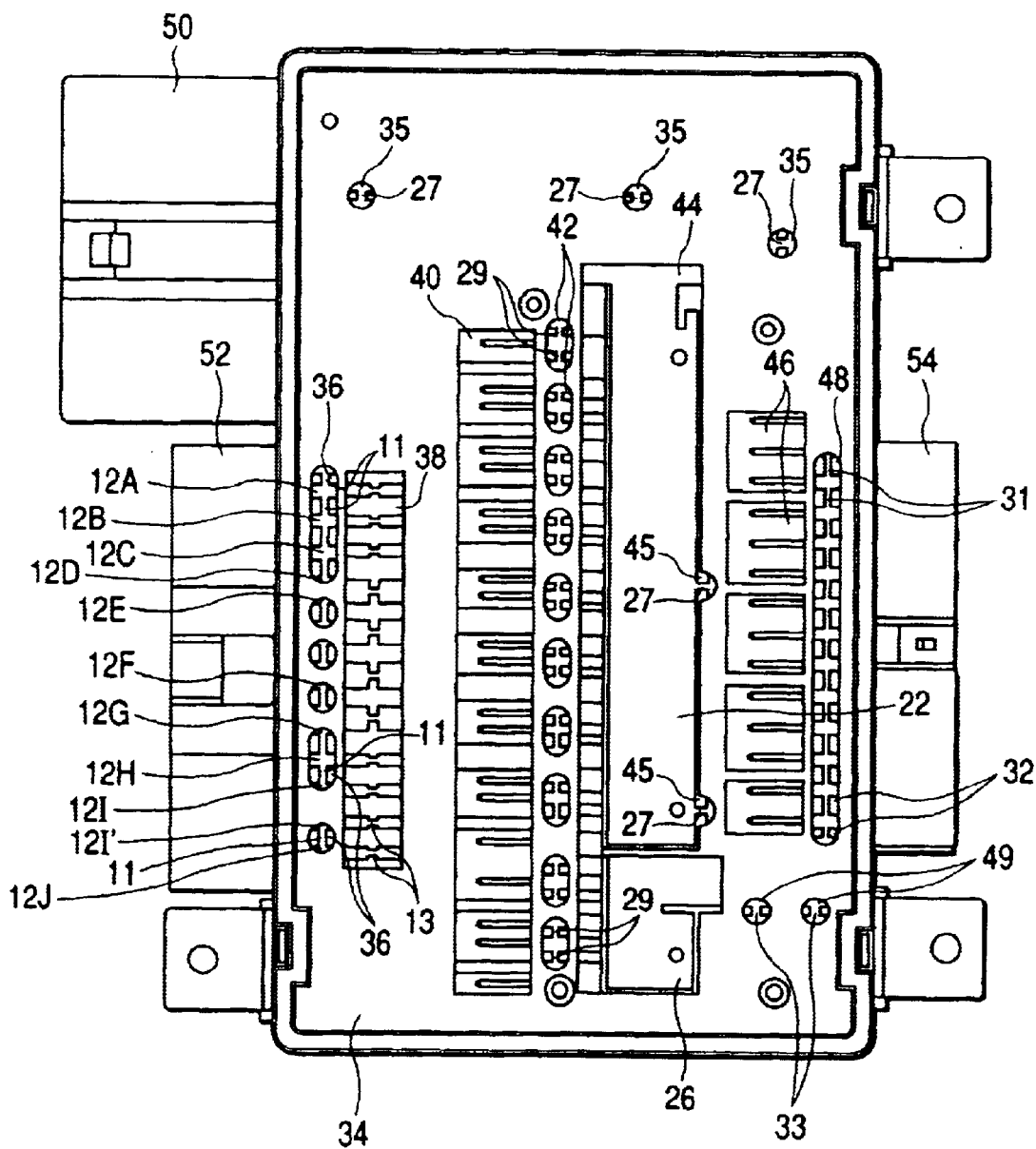
FIG. 10 is a plan view showing a situation in which resin mold is formed outside the original plate.
Figure 11:
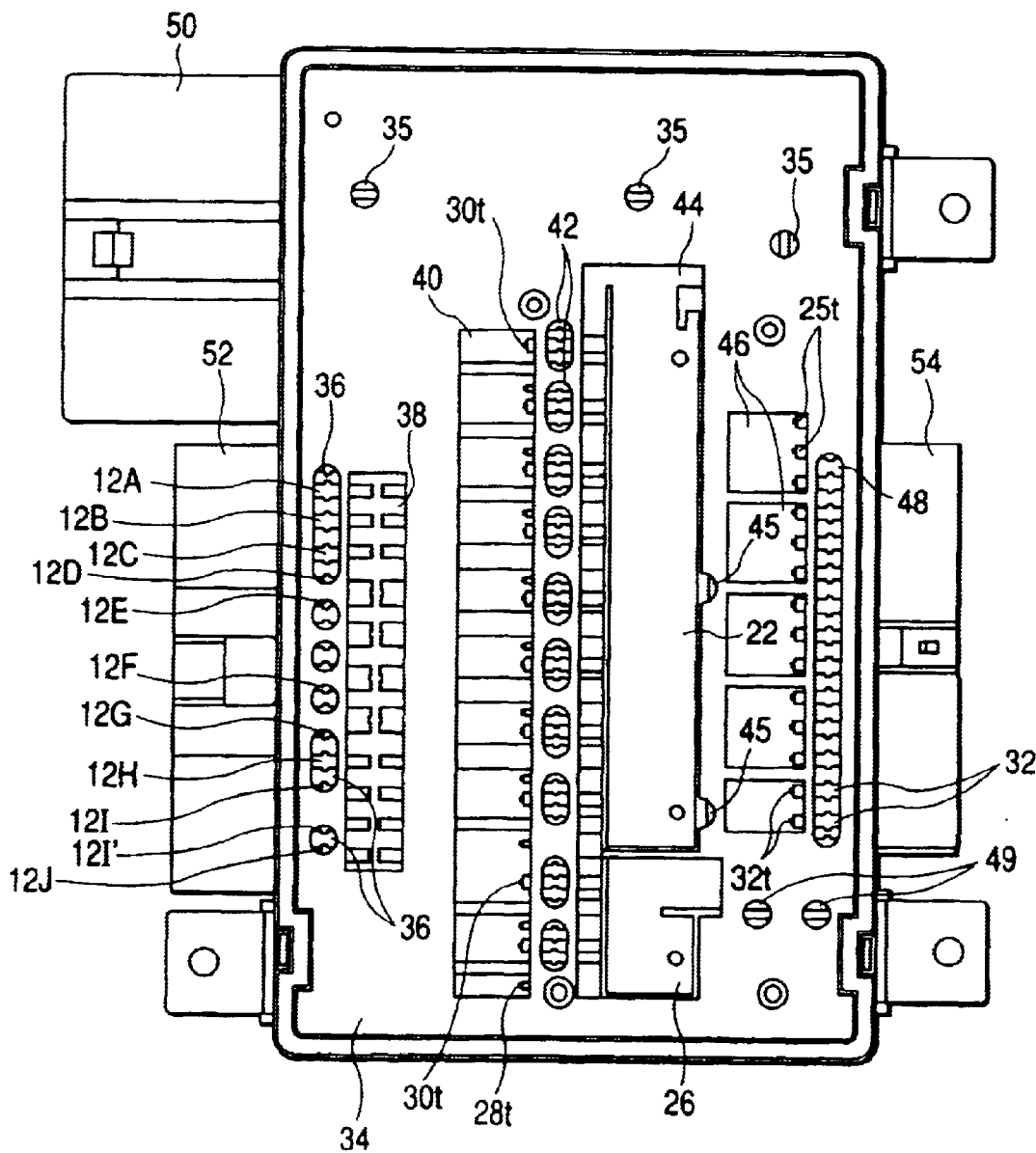
FIG. 11 is a plan view showing a situation in which each connection portion of the original plate is cut through a window formed in the resin mold, and a tab is bent upwardly.

Outside the original plate, the resin mold structuring the case main body 34 is formed. In this resin mold, as shown in FIG. 10, the windows for cutting 35, 36, 42, 48, 49 to expose the connection portions 27, 11, 29, 31, 33 upward and downward, the window for elements 44 to expose the drain connection portions 22 and 26 upward and downward, the window for terminals 40 to expose the claw portions corresponding to the tabs 28t and 30t, upward and downward, the window for terminals 46 to expose the claw portions corresponding to the tabs 25t and 32t, upward and downward, and the window for fuse to expose the connection portion 13 upward and downward, are formed. Then, a window 43 whose shape is the same as the base portion 56h of the heat radiation member 56 at a position connecting to the windows for elements 44 and 40 on the lower surface of the case main body 34, is formed.

(3) Cutting Process

The connection portions 27, 11, 29, 31, and 33 are cut by, for example, a press through the windows for cutting 35, 36, 42, 48 and 49. In this connection, in this cutting process, it is more effective when the cutting operation included in the fuse arrangement process, which will be described later, that is, the cutting of each of connection portions 13 is also simultaneously conducted through the windows for fuses 36.

Further, when these windows 35, 36, 42, 48, 49, and 38 are opened on both of the front and rear sides as shown in the drawing, the press tool can be inserted from the both sides, and each of connection portions can be cut more simply.

(4) Element Arrangement Process

Each of FETs 14 is mounted in the windows for element 44. That is, the FETs 14 are fixed onto the drain connection portions 22 and 26 by the welding such as soldering under the condition that the drain terminal of the rear surface of each of FETs 14 is brought into contact with the drain connection portions 22 and 26, and the source terminal 14s of each of FETs 14 is connected to the rear end of corresponding relay portions 28A–28J, and the gate terminal 14g is connected to the rear end of the corresponding control terminal 30, respectively by soldering.

(5) Upwardly Bending Process

The tabs 28t and 30t are formed by bending the claw portions of relay portions 28A–28J and control terminals 30 upwardly, in the windows for terminal 40, and in the same manner, in the windows for terminal 46, by bending the claw portion of the metallic plate 20 and the signal terminal 32 upwardly, the tabs 25t and 32t are formed.

(6) Board Connection Process

The control circuit board 18 is arranged just above the FETs 14, and each of tabs 28t, 30t, 25t, and 32t is inserted into the through holes provided in the control circuit board 18, and fixed by soldering. Thereby, each terminal and the control circuit of the control circuit board 18 are electrically connected.

(7) Fuse Portion Arrangement Process

After the connection portion 13 is cut through the windows for fuse 38, the Fuse member 16 is inserted between both end portions formed by the cutting. Specifically, as shown in FIGS. 5A and 5B, both end portions 16b of the fuse member 16 are respectively connected to end portions formed by the cutting by welding.

(8) Production of the Heat Radiation Member and Assembling Process

Separately from the assembly of the power distributor, the heat radiation member 56 is produced. In the heat radiation member 56 according to the present embodiment, because the longitudinal direction of the base portion 56h and fin 56f coincide with each other, the long size material having the cross sectional shape including the base portion 56h and the fin 56f, is formed by, for example, extrusion molding, and by cutting it into an appropriate dimension, its mass production can be attained. Then, the heat radiation member 56 is attached onto the rear surface of the case main body 34 so as to cover the rear surface and fixed by bolts. In this case, the base portion 56h which is protruded from the heat radiation member 56, is inserted into the window 43 of the case main body 34, and the base portion 56h is thermally connected to the drain connection portions (conductor boards) 22 and 26 of the metallic plates 20 and 22 through the insulation sheet 58.

After that, when the cover 60 is attached onto the case main body 34, the FETs 14 and the control circuit board 18 can be covered by the cover 60, and by the longitudinal partition walls 62 and 64, each of fuse portions 16 can be individually separated. Accordingly, when the Fuse portion FS is fused, its fragment can be prevented from being brought into contact with the other conductor portion, and causing the short-circuit.

In this connection, the embodiment of the present invention is not limited to the above description, but as examples, the following modes may be allowable.

In the present invention, the semiconductor switching element to be used, is not limited to the power MOSFET, but each kind of semiconductor element having the switching function, such as the other transistor (for example, IGBT or normal bipolar transistor) or each kind of thyristor including GTO, can be applied corresponding to the specification. Further, such the semiconductor element is not limited to a package element, but, may also be an element on which, for example, the semiconductor chip is directly mounted. The connection mode of the semiconductor switching element to each terminal is also specifically not a problem, and, for example, the wire bonding may also be used at an appropriate portion.

The fuse portions FS can be integrally formed on each of output terminals. However, as described above, when the output terminals 12A–12J are divided on the middle, and in the divided portions, another fuse members 16 are inserted, for the material of the output terminals, for example, the low cost material is selected, and on the one hand, as the material of the fuse member 16, the material whose fusing characteristic can be easily obtained, can be selected. As the preferable material, for example, copper alloy, or aluminum alloy, etc is listed.

The separation portion to separate each of fuse members 16 (in the drawing, the partition walls 62, 64) can also be formed on the case main body 34 side. However, when the separation portion is provided in the protruding condition on the rear surface side of the cover 60 as described above, in the situation that the cover 60 is removed, the fuse members 16 can be easily attached without any interference of the separation portion.

In the present invention, the specific shape of the resin mold is not a problem, but, at least by protruding each terminal from the resin mold toward the outside, the electric connection to the outer circuit can be conducted. Further, each terminal may be integrated by a means other than the resin mold.

In the present invention, the specific shape of the resin mold is not a problem, but, at least by protruding each terminal from the resin mold toward the outside, the electric connection to the outer circuit can be conducted. Further, each terminal may be integrated by a means other than the resin mold. In any cases, when each terminal is arranged on almost the same plane as described above, the great reduction of the thickness of the whole power distributor can be attained.

In the present invention, the specific shape of the heat radiation member 56 may be freely set. However, when the shape to cover the almost whole of the rear surface of the case main body 34 is adopted as described above, the wide heat radiation area can be assured, while keeping the thin type structure, and by the shape of the base portion 56h, the thermal connection of the heat radiation member 56 to the drain connection portions 22 and 26 can be conducted without any trouble.

In the present invention, the specific shape of the resin mold is not a problem, but, at least by protruding each terminal from the resin mold toward the outside, the electric connection to the outer circuit can be conducted, and further, by the formation of the windows 36 for the fuse, the fuse portion FS can be arranged without any trouble. Alternatively, each terminal may be integrated by a means other than the resin mold. In any cases, when each terminal is arranged on almost the same plane as described above, the great reduction of the thickness of the whole power distributor can be attained.

In the present invention, the number of input terminals is not a problem, but any one of the input terminals 10I and 10L may be neglected corresponding to the case, and reversely, the other input terminal connected to the power source through another path may be added (for example, a horn input terminal). Further, according to the wiring of the peripheral wire harness, the direction of the input terminal and the direction of the output terminal may be made different from each other, or the direction of a portion of them may be made different among input terminals or among output terminals.

Figure 12:
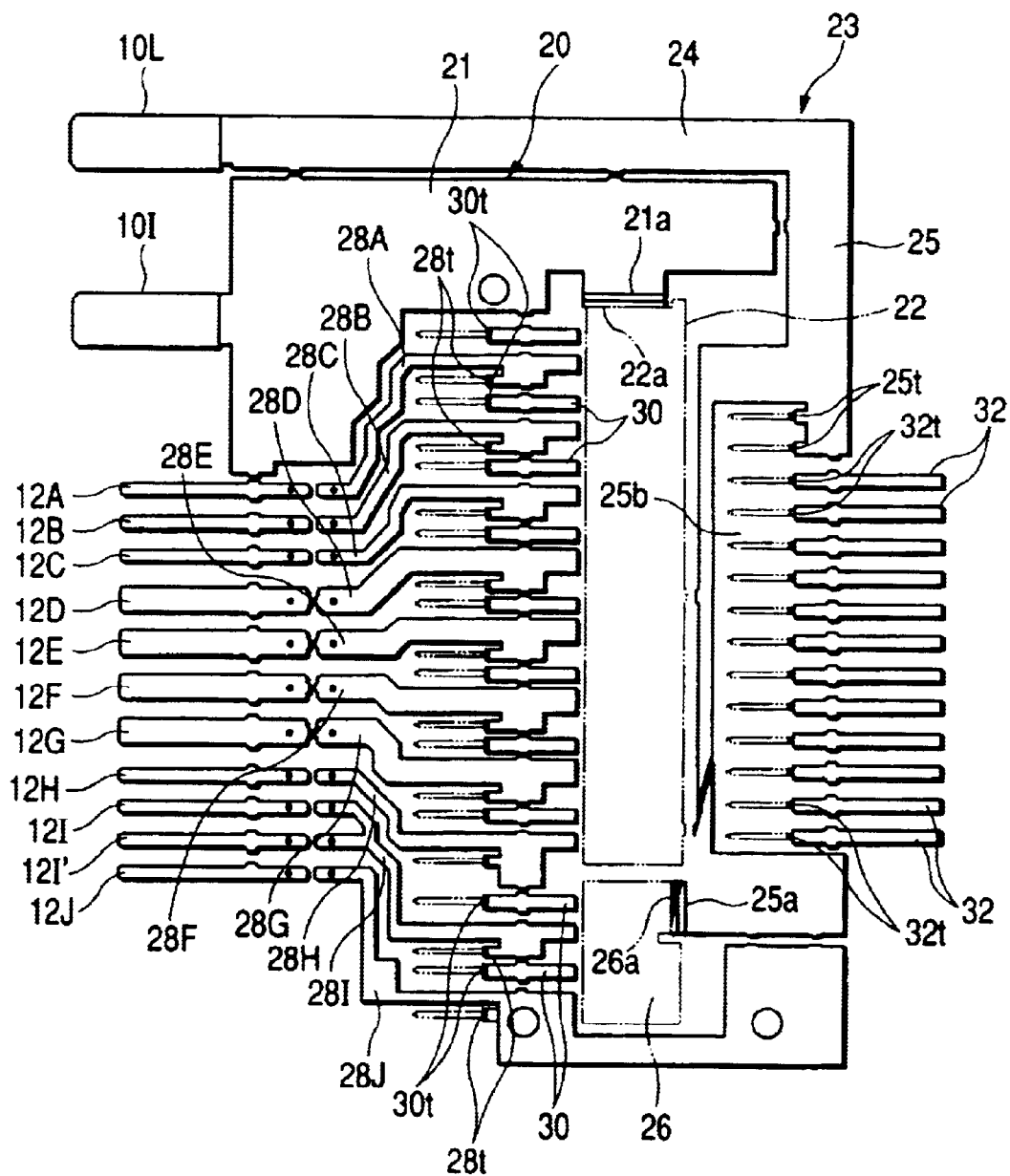
FIG. 12 is a plan view showing an example in which the drain connection portion of the power distributor is another member different from the input terminal.
Figure 13:
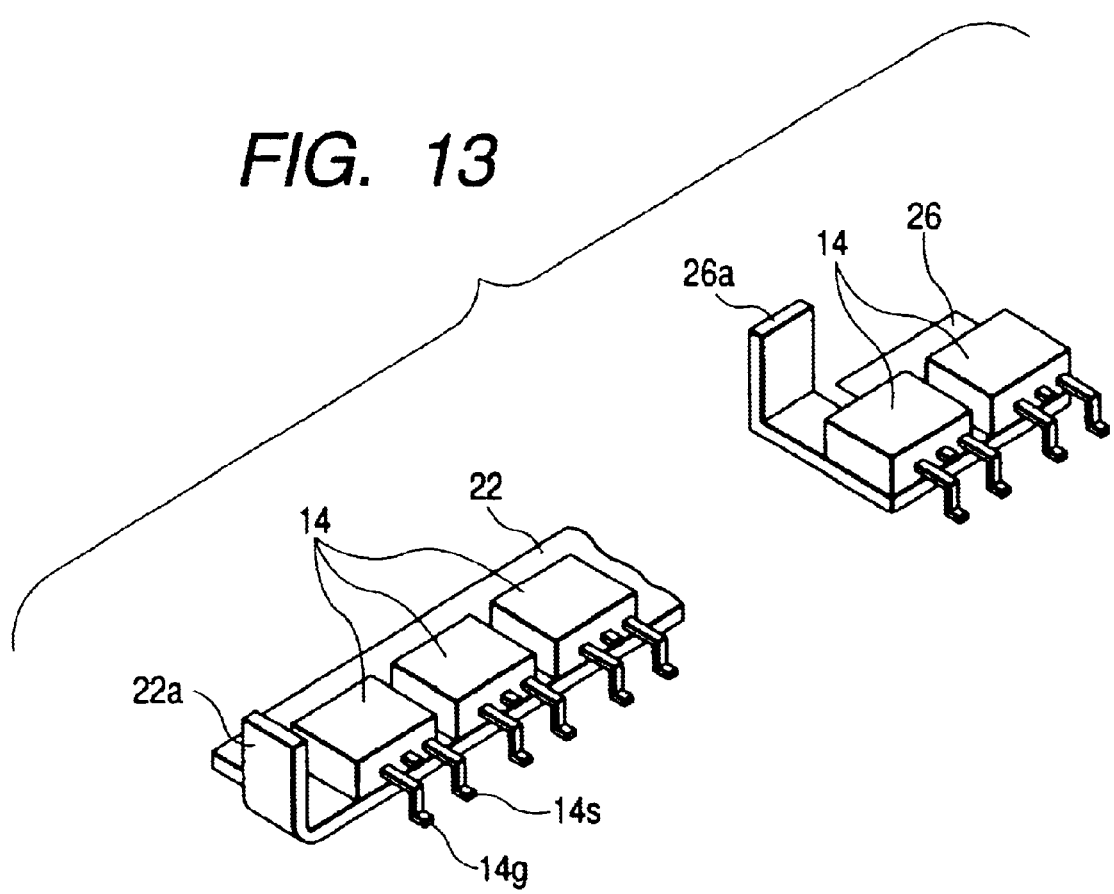
FIG. 13 is a perspective view showing a condition that each FET is mounted on the drain connection portion shown in FIG. 12.
Figure 14:
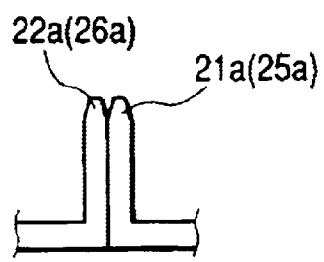
FIG. 14 is a view showing an example of a connection structure of the drain connection portion and a metallic plate by which the input terminal is formed.

In FIG. 2, the example in which the drain connection portions 22 and 26 which is an element connection portion, are respectively integrally formed with the input terminals 10I and 10L, (formed from single metallic plates 20 and 23), is shown, however, for example, the metallic plates 20 and 23 and the drain connection portions 22 and 26 may be separated member. An example of that case is shown in FIG. 12–FIG. 14.

In the drawing, the drain connection portions 22 and 26 are respectively structured by an almost rectangular metallic palate, and portions at which the drain connection portion 22 and the relay portion 21 of the metallic plate 20 respectively adjoin, are respectively bent upwardly, and form the connection pieces 22a and 21a, and portions at which the drain connection portion 26 and the second relay portion 25 of the metallic plate 23 respectively adjoin, are also respectively bent upwardly, and form the connection pieces 26a and 25a. Then, both of connection pieces 22a and 21a, and both of connection pieces 26a and 25a are faced with each other as shown in FIG. 14, and connected by, for example, welding.

In such the structure, the source electric power inputted into the input terminal 10I (10L) can be inputted into the drain terminal of each of FETs 14 respectively through the metallic plate 20(23) and the drain connection portion 22 (26).

In the present invention, the material of the conductor board (in the embodiment, the material of the metallic plates 20 and 23) may be a material having the good conductivity and the thermal conductivity to some extent, and for example, copper or copper alloy is preferable.

In the embodiment, the example in which the tabs 28t, 30t, 32t, and 25t are bent upwardly from each terminal and are connected to the control circuit board 18 is shown, however, each terminal and control circuit boards 18 may also be connected by another terminal member.

As described above, in the present invention, because the input terminal connected to the semiconductor switching element, and output terminal and more preferably the control terminal are structured by a metallic plate, and these terminals are arranged on the same plane perpendicular to the plate thickness direction, by the simple and thin structure, the good power distribution can be conducted from the car-mount power source to each electronic unit. Further, the metallic plate can be integrated by the resin mold, thereby, the structure can be greatly simplified. The power distributor can be produced by a simple method by which, after the punching of the metallic plate and the molding of the resin mold, a predetermined position of the metallic plate is cut and the semiconductor switching elements are mounted, and can also contributes to the decrease of the cost.

Further, in the present invention, because each of semiconductor switching elements inserted between the input terminal and the output terminal is mounted on the common conductor board electrically connected to the input terminal, and the conductor board is thermally connected to the heat radiation member exposed to the outside of the case, when the conductor board is commonly used as a medium to electrically connect each of semiconductor switching elements to the input terminal collectively, and a medium to thermally connect each of semiconductor switching elements to the heat radiation member collectively, there is an effect in which its cooling can be effectively conducted, while the semiconductor switching elements are adequately assembled in the distribution circuit, in a simple structure having a small number of parts.

As described above, in the power distributor in which the semiconductor switching element exists between the input terminal connected to the car-mount power source and the output terminals connected to each of electronic units, because, when the current flowing through any of semiconductor switching elements exceeds the predetermined cut-off current, the control circuit to forcibly turn off the semiconductor switching element is provided, and the fuse portion is provided in series to each of semiconductor switching elements, and when the semiconductor switching element is not normally turned off, by the fusing of the fuse portion, its downstream side circuit is protected from the over current, the circuit (for example, the circuit element such as the wire harness) can be surely protected (double protection) from the over current Further, because the frequency of fusing of the fuse portion is very low, the replacement operation is basically not necessary, thereby, the maintenance operation is greatly simplified as compared to the conventional electric connection box.

What is claimed is:

1. A power distributor for distributing electric power from a power source equipped in a vehicle to a plurality of electronic units, the power distributor comprising:

an input terminal connected to the power source, a plurality of output terminals connected to each of electronic units; and a plurality of semiconductor switching elements disposed between the input terminal and each of output terminals, wherein the input terminal and the plurality of output terminals are formed of metallic plates, respectively; and the input terminal and the plurality of output terminals are arranged on the same plane perpendicular to a direction of the thickness of the metallic plates.

2. The power distributor according to claim 1, wherein the input terminal and the plurality output terminals are integrated with each other by resin mold; and end portions of each of the input terminal and the plurality of output terminals are protruded outside of the resin mold.

3. The power distributor according to claim 1 further comprising:

a cover attached to the resin mold to cover each of the semiconductor switching elements, wherein the cover and the resin mold form a case for accommodating the plurality of semiconductor switching elements.

4. The power distributor according to claim 1, wherein the input terminal comprises a plurality of input terminals connected to the power source through different paths from each other.

5. The power distributor according to claim 4, wherein each of the plurality of input terminals is disposed to protrude in the same direction.

6. The power distributor according to claim 1, wherein all of the plurality of output terminals are disposed to protrude in the same direction.

7. The power distributor according to claim 5, wherein each of the plurality of output terminals is disposed to protrude in the same direction.

8. The power distributor according to claim 6, wherein an element connecting portion, extended in parallel to the arrangement direction of each of the output terminals and electrically connected to the input terminal, is arranged at a position adjacent to a far end of each of the output terminals;

the plurality of semiconductor switching elements corresponding to the plurality of output terminals are arranged to correspond to the arrangement of each of the output terminals; and each of the semiconductor switching elements has a first terminal electrically connected to each of the output terminals, and a second terminal connected to the element connection portion.

9. The power distributor according to claim 8, wherein each of semiconductor switching elements is directly mounted on the element connection portion.

10. The power distributor according to claim 8, wherein the element connection portion and the input terminal electrically connected to the element connection portion are integrally formed of a single metallic plate.

11. The power distributor according to claim 8, wherein each of output terminals is arranged in a smaller pitch than that of each of semiconductor switching elements;
   each of the output terminals has a relay portion having a shape respectively spreading as it goes from its protruded end toward the second terminal of each of the semiconductor switching elements; and
   the second terminal of each of semiconductor switching elements is directly connected to the relay portion.

12. The power distributor according to claim 11, wherein the plurality of output terminals includes a large current output terminal and a plurality of small current output terminals whose width is smaller than that of each of the large current output terminals, the small current output terminals arranged on both outsides of the large current output terminal; and
   a path of the relay portion of the large current output terminal is shorter than a path of the relay portion of each of the small current output terminals.

13. The power distributor according to claim 1, further comprises a fuse being fused at the time of occurrence of the over current, at the middle portion of each of the output terminals.

14. The power distributor according to claim 1 further comprising a control circuit board and a plurality of board terminals electrically connected to the control circuit board,
   wherein the board terminals are formed of metallic plates, and arranged on the same plane as the input terminal and the output terminals.

15. The power distributor according to claim 14, wherein the board terminals are integrated with the input terminal and the output terminals by the resin mold, and the end portion of each of the input terminal, the output terminals, and the board terminals protrudes on the outside of the resin mold.

16. The power distributor according to claim 15 further comprising a cover attached to the resin mold to cover each of the semiconductor switching elements and the control circuit board;
   wherein the cover and the resin mold form a case for accommodating the plurality of semiconductor switching elements and the control circuit board.

17. The power distributor according to claim 14, wherein the control circuit board is arranged in almost parallel to a plane at a position separated from a plane on which the input terminal, output terminals and the board terminals are arranged; and
   end portions of the board terminals are bent upwardly toward the control circuit board and connected to the control circuit board.

18. The power distributor according to claim 17, wherein each of the board terminals include a control terminal for connecting a current flow control terminal of each of semiconductor switching elements to the control circuit board;
   the control terminals is alternately arranged with the output terminals; and
   one end portion of the control terminal is directly connected to the current flow control terminal of the semiconductor switching element, and the other end portion is bent upwardly toward the control circuit board.

19. The power distributor according to claim 17, wherein each of the board terminals include a signal terminal for inputting and outputting a signal from an outside to the control circuit board;
   the signal terminals are arranged so that one end portion of each of the signal terminals protrudes in the same direction;
   the other end portion of each of the signal terminals is bent upwardly toward the control circuit board; and
   the output terminals are arranged to sandwich the semiconductor switching element with each of the signal terminals and protrude in the reverse direction to the signal terminals.

20. The power distributor according to claim 19, wherein each of the board terminals include a control terminal for connecting a current flow control terminal of the semiconductor switching element to the control circuit board;
   the control terminal is alternately arranged with the output terminal; and
   one end portion of each of the control terminals is directly connected to the current flow control terminal of each of the semiconductor switching elements, and the other end portion is bent upwardly toward the control circuit board; and
   the control circuit board is arranged at a position where the semiconductor switching element is stepped over between the control terminal and the signal terminal.

21. A power distributor for distributing electric power from a power source equipped in a vehicle to a plurality of electronic units, the power distributor comprising:
   an input terminal connected to the power source;
   a plurality of output terminals connected to each of the electronic units;
   a plurality of semiconductor switching elements each having a first current flowing terminal provided corresponding to the output terminals and electrically connected to the input terminal, and a second current flowing terminal electrically connected to the output terminals;
   a case for accommodating the semiconductor switching elements; and
   a heat radiation member provided to be exposed outside the case,
   wherein each of the semiconductor switching elements is electrically connected to the input terminal on a conductor board electrically connected to the first current flowing terminal; and
   the conductor board is thermally connected to the heat radiation member.

22. The power distributor according to claim 21, wherein an metallic sheet forms the conductor board and the input terminal.

23. The power distributor according to claim 21, wherein the input terminal and the output terminals are arranged on almost the same plane, and the heat radiation member is arranged in almost parallel to the plane.

24. The power distributor according to claim 23, wherein the input terminal and the output terminals are integrated by a resin mold;
   a main body of the case is structured by the resin mold;
   a window from which the conductor board is exposed to the outside is formed in the main body of the case;
   the heat radiation member having a shape to cover almost the whole surface of the case is provided on the one side of the case; and
   the heat radiation member is thermally connected to the conductor board through the window.

25. The power distributor according to claim 24, wherein a position where the heat radiation member is thermally connected to the conductor board, is abase portion which locally protrudes inside the case from the inside surface of the heat radiation member;

the base portion is inserted into the window of the case main body; and an amount of the protrusion of the base portion is set so that the second current flowing terminal of each of semiconductor switching elements on the conductor board thermally connected to the base portion is just positioned at a height at which the second current flowing terminal is connected to each of the output terminals.

26. The power distributor according to claim 25, wherein the output terminals are laterally aligned in a row;

each of semiconductor switching elements is mounted being aligned in a row on the conductor board in the arrangement corresponding to the arrangement of the output terminals;

the base portion and the window are formed in a shape to extend in the parallel direction to the arrangement direction of thee semiconductor switching elements.

27. The power distributor according to claim 26, wherein a plurality of fins are formed on the rear surface of the heat radiation member;

the longitudinal direction of these fins coincides with the longitudinal direction of the base portion; and the whole body of the heat radiation member is integrally formed.

28. The power distributor according to claim 23, further comprising a control circuit board for controlling the current flowing among the current flowing terminals of each of the semiconductor switching elements, the control board arranged in almost parallel to a plane on which the input terminal and the output terminals are arranged and in the separated condition from each of the semiconductor switching elements, on the opposite side to the heat radiation member.

* * * * *